US009080056B2

(12) United States Patent
Glennon et al.

(10) Patent No.: US 9,080,056 B2
(45) Date of Patent: Jul. 14, 2015

(54) PROCESS FOR PREPARING SILICA MICROPARTICLES

(75) Inventors: Jeremy D. Glennon, County Cork (IE); Jesse Omamogho, County Cork (IE)

(73) Assignee: University College Cork—National University of Ireland, Cork, Cork (IL)

( * ) Notice: Subject to any disclaimer, the term of this patent is extended or adjusted under 35 U.S.C. 154(b) by 1084 days.

(21) Appl. No.: 13/131,294

(22) PCT Filed: Nov. 26, 2009

(86) PCT No.: PCT/IE2009/000083
§ 371 (c)(1),
(2), (4) Date: May 26, 2011

(87) PCT Pub. No.: WO2010/061367
PCT Pub. Date: Jun. 3, 2010

(65) Prior Publication Data
US 2011/0226990 A1    Sep. 22, 2011

(30) Foreign Application Priority Data
Nov. 26, 2008 (IE) ................................. 2008/0940

(51) Int. Cl.
| | |
|---|---|
| *C09C 1/28* | (2006.01) |
| *B01J 20/283* | (2006.01) |
| *C09C 1/30* | (2006.01) |
| *B01J 20/286* | (2006.01) |
| *B01J 20/32* | (2006.01) |
| *C01B 33/18* | (2006.01) |

(52) U.S. Cl.
CPC ............. *C09C 1/3054* (2013.01); *B01J 20/283* (2013.01); *B01J 20/286* (2013.01); *B01J 20/3204* (2013.01); *B01J 20/3234* (2013.01); *B01J 20/3244* (2013.01); *B01J 20/3295* (2013.01); *C01B 33/18* (2013.01); *C09C 1/309* (2013.01); *C09C 1/3063* (2013.01); *C01P 2002/72* (2013.01); *C01P 2002/78* (2013.01); *C01P 2002/86* (2013.01); *C01P 2002/87* (2013.01); *C01P 2004/03* (2013.01); *C01P 2004/04* (2013.01); *C01P 2004/32* (2013.01); *C01P 2004/52* (2013.01); *C01P 2004/61* (2013.01); *C01P 2004/62* (2013.01); *C01P 2004/88* (2013.01); *C01P 2006/12* (2013.01); *C01P 2006/14* (2013.01); *C01P 2006/16* (2013.01); *C01P 2006/17* (2013.01)

(58) Field of Classification Search
CPC ...... C09C 1/3054; C09C 1/309; B01J 20/283; B01J 20/3293
See application file for complete search history.

(56) References Cited

FOREIGN PATENT DOCUMENTS

| | | |
|---|---|---|
| WO | 2007/122930 | 11/2007 |
| WO | WO 2007122930 A1 * | 11/2007 |

OTHER PUBLICATIONS

Mesa et al. "Preparation of micron-sized spherical particles of mesoporous silica from a triblock copolymer surfactant, usable as a stationary phase for liquid chromatography" Solid State Sciences, 5, (2003), 1303-1308.*
J. H. Kim et al., "Synthesis of monodisperse silica spheres with solid core and mesoporous shell: Morphological control of mesopores," Colloids and Surfaces A: Physicochem. Eng. Aspects, 2008, vol. 313-314, pp. 77-81.
S. B. Yoon et al., "Synthesis of monodisperse spherical silica particles with solid core and mesoporous shell: mesopore channels perpendicular to the surface," Journal of Material Chemistry, 2007, pp. 1758-1761.
S. Lu et al., "Interfacial Separation of Particles," 2005, Elsevier BV, Amsterdam, pp. v-xii, 1-694.
R. Atkin et al., "The influence of chain length and electrolyte on the adsorption kinetics of cationic surfactants at the silica-aqueous solution interface," Journal of Colloid and Interface Science, 2003, vol. 266, pp. 236-244.
R. Atkin et al., "Adsorption Kinetics and Structural Arrangements of Cationic Surfactants on Silica Surfaces," Langmuir, 2000, vol. 16, pp. 9374-9380.
R. Atkin et al., "Adsorption of 12-s-12 Gemini Suractants at the Silica—Aqueous Solution Interface," Journal of Physical Chemistry B, 2003, vol. 107, pp. 2978-2985.
R. Atkin et al., "Mechanism of cationic surfactant adsorption at the solid-aqueous interface," Advances in Colloid and Interface Science, 2003, vol. 103, pp. 219-304.
D. Zhao et al., "Triblock Copolymer Syntheses of Mesoporous Silica with Periodic 50 to 300 Angstrom Pores," Science, Jan. 23, 1998, vol. 279, pp. 548-552.
Paul Meakin, "Computer Simulation of Growth and Aggregation Processes," On Growth and Form, 1986, Martinus-Nijhoff, Boston, MA, pp. 111-124.
C.J. Brinker et al., "Sol-gel Science: The Physics and Chemistry of Sol-gel processing," Boston Academic Press, 1990, Boston, MA, Chapter 3 only, pp. 97-233.
Donald H. Napper, "Polymeric Stabilization of Colloidal Dispersions," Academic press, 1983, New York, NY, pp. 1-16.
D.H. Napper, "Steric Stabilization," Journal of Colloid and Interface Science, Feb. 1977, vol. 58, No. 2, pp. 390-407.

(Continued)

*Primary Examiner* — Peter F Godenschwager
(74) *Attorney, Agent, or Firm* — Jacobson Holman, PLLC

(57) ABSTRACT

Silica core-shell microparticles are prepared by growing a porous silica shell from a silica precursor onto the surface of non-porous silica particle dispersed in a mixed surfactant solution under basic pH conditions. The particles are hydrothermally treating in an oil-in-water emulsion system and the particles are calcined to remove residual surfactants. Optionally, the particles of may be base etched to expand the size of the pores in the silica shell. Core-shell silica particles with an ordered mesoporous layer are produced.

30 Claims, 17 Drawing Sheets

(56) References Cited

OTHER PUBLICATIONS

T. Sato et al., "Stabilization of Colloidal Dispersions by Polymer Adsorption," Marcel Dekker, 1980, New York, NY, Chapter 3 only, pp. 65-76.

M. Aubouy et al., "Irreversible Adsorption of a Polymer Melt on a Colloidal Particle," Europhysics Letters, 1993, vol. 24, No. 2, pp. 87-92.

R. H. Ottewill, "Stability and Instability in Disperse Systems," Journal of Colloid and Interface Science, Feb. 1977, vol. 58, No. 2, pp. 357-373.

J. Th. G. Overbeek, "Recent Developments in the Understanding of Colloid Stability," Journal of Colloid and Interface Science, Feb. 1977, vol. 58, No. 2, pp. 408-422.

G. H. Bogush et al., "Preparation of Monodisperse Silica Particles: Control of Size and Mass Fraction," Journal of Non-Crystalline Solids, 1988, vol. 104, pp. 95-106.

C. du Fresne von Hohenesche et al., "Development of standard operation procedures for the manufacture of n-octadecyl bonded silicas as packing material in certified reference columns for reversed-phase liquid chromatography," Journal of Chromatography A, 2004, vol. 1025, pp. 177-187.

A.S. Maria Chong et al., "Functionalization of large-pore mesoporous silicas with organosilanes by direct synthesis," Microporous and Mesoporous Materials, 2004, vol. 72, pp. 33-42.

G. Büchel et al., "A Novel Pathway for Synthesis of Submicrometer-Size Solid Core/Mesoporous Shell Silica Spheres," Advanced Materials, 1998, vol. 10, No. 13, pp. 1036-1038.

L. Yang et al., "Preparation and functionalization of mesoporous silica spheres as packing materials for HPLC," Particuology, Jun. 1, 2008, vol. 6, pp. 143-148.

Zhong-Yong Yuan et al, "Characterization of pore systems of mesoporous silicas templated by cetylpyridinium under mild-alkaline condition: the effect of low-temperature ammonia post treatment," Colloids and Surfaces A: Physiochemical Engineering Aspects, 2004, vol. 241, pp. 95-102.

\* cited by examiner

A

B

A

B

A

B

A

B

PROCESS FOR PREPARING SILICA MICROPARTICLES

This is a national stage of PCT/IE09/000083 filed Nov. 26, 2009 and published in English, which claims the priority of Irish number 2008/0940 filed Nov. 26, 2008, hereby incorporated by reference.

This invention relates to a process for preparing microparticles for use in chromatography, such as liquid chromatography. In particular, the invention relates to a method of producing sub-2μm microparticles for use in chromatography.

Porous silica microparticles are widely used in many different applications ranging from catalysis to chromatographic sorption supports. For example, ordered mesoporous silica (OMS) particles such as the hexagonal ordered mesoporous molecular sieve known as MCM-41 (Mobil Corporation) has been used in chromatography. The MCM-41 material is prepared using a cationic cetyltrimethylammonium (CTA+) surfactant (templating agent) having a d(100) spacing of about 40 Å to form pores in the particles. When the MCM-41 material is subjected to calcination, a final pore size in the range of 20 to 30 Å is achieved. SBA-15 is a commercially available material that comprises ordered hexagonal mesoporous silica particles with a tuneable large uniform pore size. The process for making SBA-15 particles employs a non-ionic surfactant (templating agent) of amphiphilic block co-polymer to direct the pore formation.

WO2007/095158 describes solid core silica particles having a porous thick shell layer on the outer surface of a solid core. These particles have been developed by Advanced Materials Technology Delaware under the brand name Halo®. These core-shell silica particles have a total particle size of 2.7 μm. The Halo® particles are formed using a fused core technology and comprise a 1.7 μm diameter non-porous spherical particle (core) and a 0.5 μm thick porous outer layer (shell). The shell is comprised of aggregated porous nanoparticles in solution (silica sol) fused to the surface of the non-porous silica core. The fused core technology used to create the porous layer (shell) of the Halo® particles requires the use of urea-formaldehyde and other related compounds to fuse aggregates of silica nanoparticles to the surface of the solid non-porous core. The fusing step is followed by high temperature treatment to strengthen inter-nanoparticle bonds.

DE-19530031 (Unger et al) describes a process for forming templated core-shell sub-2 μm silica particles comprising a porous layer on the surface of a non-porous silica core by sol-gel polycondensation of an alkyltrialkoxysilane in an ammonia-water solution in which ammonia acts as a catalyst and alkyltrialkoxysilane functions as porogen. The average particle size produced by this process is less than 1000 nm (1.0 μm).

WO2007/122930A describes a method for providing a core-shell silica by dispersing non-porous silica core particles into alcohol and water in the presence of a surface active agent. A silica material is added to the dispersion. The silica material is reacted at pH 8 to 13 to form a shell precursor containing silica and the surfactant on the surface of the silica core. The surfactant is then removed to form a porous shell.

STATEMENTS OF INVENTION

The invention provides a process for preparing silica core-shell microparticles comprising the steps of:
(a) growing a porous silica shell from a silica precursor onto the surface of non-porous silica particle dispersed in a mixed surfactant solution under basic pH condition;
(b) hydrothermally treating the particles of (a) in an oil-in-water emulsion system to expand the size of the pores in the silica shell;
(c) calcining the particles of (b) to remove residual surfactants.

In one embodiment the mixed surfactant comprises a cationic surfactant and a non-ionic surfactant.

The surfactant solution may consist of mixture of cationic mono alkyl quaternary ammonium halide and non-ionic block co-polymer surfactant or it can be cationic di-quaternary ammonium polyether derived from polyether amine.

To achieve maximum pore size, silica shell, cationic di-quaternary ammonium polyether as template can also be employed as the pore expander.

Soft chemical etching treatment, using dilute ammonium hydroxide and hydrogen peroxide to etch the pore wall (leading to pore widening), can also be practiced.

The mixed surfactant solution may comprise an alkyl trimethylammonium comprising the formula:

wherein: n is an integer between 12 and 20;
R is an alkyl group of the form, $CH_3$, $CH_3CH_2$, $CH_3CH_2CH_2$, or $CH_3CH_2CH_2CH_2$; and
X is Cl, Br or I, The alkyl trimethylammonium halide may be octadecyl trimethoxysilicone and/or hexadecyl trimethylammonium bromide.

The mixed surfactant solution may comprise a tri-block co-polymer. The tri-block co-polymer may be a difunctional pluronic block co-polymer.

The tri-block co-polymer may comprise a polyethylene oxide (PEO) and/or a polypropylene oxide (PPO) unit. The tri-block co-polymer may have a terminal HO— group at one or both ends of the PEO group.

The triblock co-polymer may comprise the formula:

wherein: x is an integer between 5 and 106; and
y is an integer between 30 and 85.

The tri-block co-polymer may be $PEO_{20}$ $PPO_{70}$ $PEO_{20}$ and/or $PEO_{106}$ $PPO_{70}$ $PEO_{106}$.

The tri-block co-polymer may act as a stearic stabiliser to prevent aggregation during growth of silica shell.

The tri-block co-polymer may interact indirectly with a silica surface via hydrogen bonding.

The mixed surfactant solution may comprise a di-block or tri-block co-polymer. The di-block or tri-block co-polymer may be a difunctional block co-polymer.

The di-block or tri-block co-polymer may comprise a polyethylene oxide (PEO) and/or a polypropylene oxide (PPO) unit. The di-block or tri-block co-polymer may have a terminal HO— group at one or both ends of the PEO or PPO group.

The di-quaternary ammonium polyether may be derived from polyether amine and may consist of only polypropylene oxide (PPO) backbone as shown in chemical structure 1. or a combination of polypropylene oxide (PPO) and polyethylene oxide back-bone as shown in chemical structure 2. The di-block or tri-block co-polymer may have a terminal quaternary ammonium group at one or both ends of the PEO or PPO group with the formula:

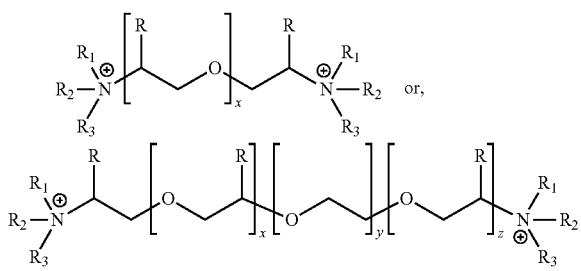

The silica precursor may be an alkoxy silica precursor.

The silica precursor may be one or more of tetrapropyl ortho silicate (TPOS), tetraethyl ortho silicate (TEOS), and tetramethyl ortho silicate (TMOS).

Ammonia may be added to the growth step to form the basic pH conditions.

The oil-in-water emulsion may comprise one or more of an aliphatic alkane, a cycloalkane, or aromatic hydrocarbon of the formula:

$$C_nH_{2+2n}, C_nH_{2n}, C_nH_{n-x}(CH_3)_x,$$

wherein: n is an integer between 6 to 12; and
x is an integer between 1 to 3

The oil unit of the oil-in-water emulsion system may comprise one or more of decane, trimethylbenzene, and cyclooctane.

Step (a) of the process may be repeated at least once, such as between 2 and 30 times.

Step (a) of the process may be performed at a temperature between about 25° C. to about 55° C.

The particles may be hydrothermally treated at a temperature of from about 60° C. to about 130° C. The particles may be hydrothermally treated from about 1 hour to about 72 hours.

The hydrothermally treated particles may be dried prior to calcination. The particles may be dried under vacuum. The particles may be dried at a temperature of between about 98° C. to about 102° C. The particles may be dried for about 24 hours.

The particles may be calcined at a temperature of about 500° C. to about 600° C. The particles may be calcined at a ramping temperature. The temperature may be ramped at a rate of between about 1° C. and about 10° C. per minute. The particles may be calcined for between about 76 hours to about 24 hours.

The invention provides a process for preparing core-shell spherical silica micro particles having a thin to thick porous shell with diameter from 100 nm to 500 nm, perpendicularly grown around the surface of non-porous silica with core diameter of 600 nm to 1500 nm. The core-shell microparticles may be used as a packing material in chromatography such as liquid chromatography.

The invention also provides a silica core-shell particle with an average diameter of between about 0.9 μm and about 2.0 μm. The core may have an average diameter of between about 0.6 μm and about 1.5 μm.

The invention further provide a silica core-shell particle with an average diameter of about 1.7 μm comprising a core with an average diameter of about 1 μm.

The invention further provide a silica core-shell particle with an average diameter of about 1.7 μm comprising a core with an average diameter of about 1 μm, specifically, the core will have a diameter of 1.0 μm to 1.5 μm.

The core may be non-porous. The core may be solid.

The shell may have an average thickness of between about 0.1 μm and about 0.50 μm. The shell may be porous. The pores may be ordered, for example the pores may be ordered in the SBA-15 class.

The pores may have an average size of between about 4 nm and about 30 nm.

The pores may have an average pore volume of between about 0.2 cc/g and about 2.0 cc/g.

The pores may have a specific surface area of from about 100 m²/g to about 1000 m²/g.

The pore may have specific surface area of 50 m²/g to 100 m²/g for larger pore size core-shell silica.

The invention provides core-shell silica particles with an ordered mesoporous layered shell.

The particles may be multilayered. The layers are formed layer by layer on the solid silica core in a series of controlled steps so that a controlled shell thickness may be achieved. The resultant shell consists of ordered mesoporous layers with ordered pores which run parallel to the surface, building up in thickness in a perpendicular direction. The particles comprise seeded growth mesoporous layered shells on a solid core.

The invention also provides a packing material comprising silica core-shell particles as described herein.

The invention also provides a chromatography packing material comprising silica core-shell particles as described herein.

The invention further provides for use of particles produced by the process described herein in liquid chromatography separation.

The invention further provides for use of particles produced by the process described herein for solid phase extraction.

The invention further provides for use of particles produced by the process described herein for packed bonded phases.

In a further aspect, the invention provides for use of the particles described herein in liquid chromatography separation.

In one aspect, the invention relates to a process for synthesising sub-2 μm silica spherical particles involving:
  interfacial physical chemistry of a surfactant ion chemisorbed at the surface of a silica core to induce hydrogen bonding interaction with a difunctional block-copolymer;
  a systematic method of using a difunctional block-copolymer as a steric stabiliser and micellar template to grow a thick porous silica shell on to a solid silica core in a basic dispersion system;
  synthesis of a porous silica shell at the surface of a non-porous solid silica core by controlling the sol-gel condensation (reaction) kinetics; and
  tuneable pore expansion of the shell, followed by drying and calcination of the core-shell silica particles.

Some of the physical properties exploited in the process described herein include:
  (a) The diffusion rate of a monomer (e.g TEOS) across the interior of an adsorbed polymer-surfactant chain can be controlled by adjusting the temperature and/or the dielectric constant of the liquid solvent;
  (b) Energy at the solid core surface interface generates active sites for the polycondensation of a monomer (e.g. TEOS) and as the monomer starts to condensate near the interface, the polymer-surfactant network restricts the rearrangement of the siloxane bonds (Si—O—Si), consequently reducing re-polymerisation; and
  (c) The reduction in re-polymerisation results in a less compact shell structure allowing room for the polymer-surfactant (as template) to organise themselves with the co-existing low density polysilicate. Following calcination to remove the templating agents pores are formed in the shell.

Some of the physicochemical properties exploited in the process described herein include:

(a) From chemical thermodynamic point of view, adsorptions that occur between the cationic charged point of monolayer or micellar aggregates and the anionic charged point of silica surface in basic solution at constant temperature are due to the chemical potential differences in the solid phase (silica) and the liquid phase (surfactant), making $\Delta G \neq 0$. This chemical state promotes the transfer of charge present in the liquid phase to charge in solid phase, resulting in an excess of positive charge at the new adsorbed surface ($S_{ads}$).

(b) When excess positive charged is formed for a relatively short time on the silica surface, $S_{ads}$ will adapt a higher free energy due to the excess surface charge. Hydrolysed soluble monomeric silicate species that are present and in constant Brownian motion in the liquid phase under basic pH tend to acquire net negative charge. At this stage, a potential difference occurs across the adsorbed solid (+)/liquid (−) interface, otherwise called surface potential, and denoted as $\Psi_o$. The surface potential drives the bulk transport of the monomeric specie (e.g. TEOS etc.) to the surface nucleation site (the closest charge point where electrons in the silicates specie undergo reorientation) of silica-adsorbed aggregates or monolayer of charged surfactant; provided that the solution system state promotes the bulk transport of monomeric specie to the nucleation site.

(c) The polycondensation of silicates species to form solid silica at the surface nucleation site proceeds as a result of the non-equilibrium surface free energy ($\Delta G \neq 0$) present at the surface of the silica-adsorbed charge surfactant. Temperature and pH play a significant role to promote the rate of diffusion of monomeric specie to nucleation sites and allow the seeded growth techniques to continuously polymerises silicate monomer on the charged surfactant adsorbed surface leading to increase in the diameter of overall substrate (silica). Because growth via polymerisation takes place upon adsorbed surfactant, this serves as template and after removal of this template by calcination or soxhlet extraction, the process will generate partially porous silica particles, to which the porous layer of the particle are the area involved with the template.

BRIEF DESCRIPTION OF THE FIGURES

The invention will be more clearly understood from the following description of an embodiment thereof, given by way of example only, with reference to the accompanying drawings, in which.

DETAILED DESCRIPTION

Figure 1:
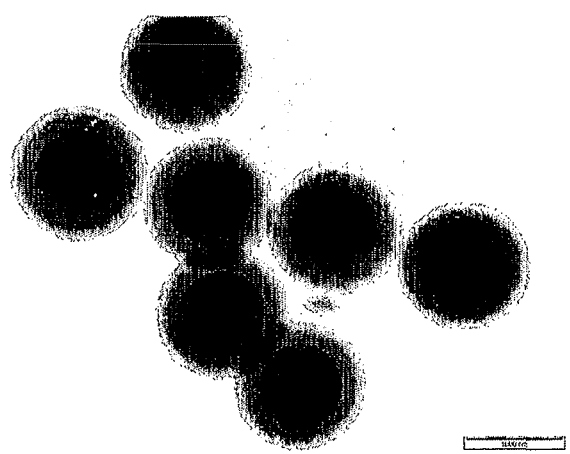
FIG. 1 is a transmission electron micrograph image of microparticles (SQ_MS_04A) prepared by a process of the invention.

We describe processes for preparing monodisperse silica spheres having a diameter between about 1.5 µm and about 2.0 µm such as about 1.7 µm, comprising a thick porous silica layer (shell) with pore sizes up to about 120 angstrom. The processes described herein involve the use of a template, such as a cationic and non-ionic surfactant under basic pH, conditioned to tailor the formation of pores in a silica shell layer. A porous silica shell is grown on a preformed non-porous silica spheres (core) via polycondensation of an alkoxysilicate.

Unlike previous methods such as those reported by Yoon et. al[1,2], we have found that to achieve a thick layer of porous silica shell (up to about 0.5 µm), the energetic interaction known as "steric effect" involved between particles adsorbed with surfactant in aqueous dispersion need to be systematically controlled at a separation distance to minimizes "mixing effect"[3]. Growing thicker shell layers of silica surrounding surfactant adsorbed nonporous spherical materials in aqueous dispersion, requires a systematic method to prevent agglomeration during the growth process. The use of co-surfactants, such as a block co-polyether with a terminal difunctional OH group to promote sterically stabilised particle system, was found to be useful in growing thicker shell (up to about 0.5 µm) under the conditions described herein. Employing a temperature above ambient conditions minimizes the changes in free energy associated with the "mixing effect" of adsorbed surfactant on silica surface, and prevents agglomeration during the growth of shell particles. Thicker silica shells are required for particles in the sub-2 µm region, for use in liquid chromatography packing. We describe a method for preparing core-shell, monodisperse, silica spheres with a diameter of between about 1.5 to about 2.0 µm. The processes described herein exploit the physicochemical interactions involved in the adsorption of a cationic surfactant onto the charged surface of silica particles[4-7] and the thermodynamic properties exhibited by adsorbed surfactant molecules and how these influence the processes of poly-condensation of alkoxy-silicates monomers present in a basic pH liquid system. The surface characteristics acquired following adsorption of a surfactant on the silica surfaces ultimately becomes the nucleation site (for alkoxysilicate). The surface nucleation site is the new surface free energy ($\Delta G_{ads}$) that is generated, accompanied by the increase in entropy gained from surface excess, due to surfactant adsorption. The continuous addition of monomer to the silica-surfactant adsorbed system dispersion, leads to the growth of silica shell due to the presence of surface nucleation sites. The shell of the silica spheres that is grown in the presence of adsorbed surfactant becomes the porous layer when the resulting particle is calcined. The calcination step is tailored to remove the underlying surfactant present the porous shell matrix. The core-shell silica particles prepared by the processes described herein can be used as a packing material for liquid chromatography.

The chain length of the adsorbed surfactant is an important parameter when designing the surfactant adsorption system to prepare templated silica. Typically, absorbed surfactants with longer chain length allow the shell thickness to grow at faster rate, in addition the longer chain lengths aid the formation of larger pore size within the shell. For CTABr, the longest commercially available chain length is the alkyl $C_{18}$ and this length will determine the final pore size. Traditionally for the preparation of SBA-15 using, for example, P123 block co-polymer as the template under acidic condition, the pore size is tuneable by hydrothermal swelling to reach up to 30 nm[8]. The swelling effect is gained as a result of the incorporation of P123 block co-polymer in the silica matrix. However, employing P123 block co-polymer in the method described herein under basic conditions will not yield similar swelling effect as found for the SBA-15. This is because the method described herein employs a mixture of cationic surfactant (e.g. CTABr) and non-ionic surfactant (e.g. P123 block co-polymer) for adsorption analysis on an anionic charged surface e.g. silica. The cationic surfactant will preferentially adsorb to the surface via electrostatic interaction. Under conditions where a non-ionic surfactant has previously been adsorbed on a silica surface, when the ionic surfactant is added, it results in the release of the pre-adsorbed non-ionic surfactant[21]. In a similar case for the CTABr/P123 mixture, CTABr dominates all adsorption, thus, severely restricting the adsorption of P123 on the charged silica surface; under this circumstances, the P123 adsorption only takes part in steric interaction leading to steric stabilisation by minimizing the mixing effect of the adsorbed CTABr solvated dangling hydrophobic chains between particles. The absence of P123 in the step of growing the silica matrix does not contribute to pore swelling. In contrast to what is normally found in the SBA-15 silica synthesis; under the conditions described herein, the CTABr/P123 surfactant mixture (at basic pH) generates a maximum pore size of about 4 nm. For use as a packing material in liquid chromatography, it is necessary to have larger pore sizes for example about 9 nm or more. To achieve larger pore sizes on the CTABr template silica, we perform a chemical etching step to carefully "thin-out" the pore walls.

The invention relates to a process for preparing sub-2 μm silica spheres comprising a thick porous layer (shell) with high surface area, large pore size and large pore volume. The porous shell may be orientated substantially perpendicular to the exterior of the outer surface of a non-porous spherical solid core of silica. The process for producing such particles is based on the hydrolytic polycondensation of alkoxysilicates in the presence of templating agents under basic condition. Subsequent hydrothermal treatment and calcination steps removes the templates from the particles to create particles comprising an ordered mesoporous shell surrounding a non-porous spherical silica core, as confirmed by X-ray diffraction spectrum. Silica particles produced by such methods may be used as a support for chromatography applications such as liquid chromatography separation.

According to the process, spherical monodisperse non-porous silica particles were used as core seeds on to which ordered porous silica shells were grown substantially perpendicular to the surface of the non-porous silica core. In this process, the method of growing a thick mesoporous shell of silica perpendicular to the surface of non-porous core seeds comprises a series of growth steps using a combination of cationic and non-ionic surfactants dispersed in a water-alcohol system followed by a hydrothermal pore enlargement step which results in an ordered mesoporous layer (shell) being formed on the non-porous core seed. The sub-2 μm silica particles formed by the process described herein are suitable for use as a support material for fast and rapid liquid chromatography without the build up of high back pressure. The sub-2 μm silica particles may also be used in delivery systems, for example drug delivery systems, and catalysis applications.

Sub-2 μm silica particles produced by the process described herein have a solid, non-porous core. Mesopores are only present in the exterior layer (shell) of the particles. Experimental analysis of the particles has confirmed that the pores of the shell are ordered in the SBA-15 class. The porous layer (shell) has a thickness of between about 100 nm to about 500 nm and the pore sizes and pore volume of the porous layer (shell) range from about 30 Å to about 300 Å and about 0.2 cc/g to about 2.0 cc/g respectively.

The process comprises two stages:
Firstly, continuous growth of polycondensation silicate species on the surface of non-porous core silica particles in the presence of a mixed surfactant solution containing both a cationic quaternary ammonium bromide (such as octadecyltrimethylammonium bromide ($C_{18}TAB$)) and a difunctional non-ionic alkyl poly (oxyalkylene) tri-block copolymer (such as pluronic P123 or pluronic F-127) as templating agents under basic pH conditions.

Secondly, the as synthesised silica particles having a porous shell surrounding the non-porous core are hydrothermally treated in an oil-in-water emulsion system to expand the size of the pores in the shell. After drying and calcination, the silica particles may be used as a packing material for liquid chromatography (LC).

The mesoporous shell silica particles made by the process described herein may be functionalised with a functional group such as a mono-, di- or tri-organosilane. The porous shell of the silica particles has an ordered mesoporous structure as confirmed by X-ray diffraction studies.

The process described herein exploits three key strategies briefly:
Interfacial chemisorption of a charged silica surface with a dilute concentration of cationic alkyltrimethylammonium bromide will alter the surface potential of the charged silica surface and reduce the number of repulsive van der Waals ($V_R$,) forces between particles which results in hydrophobic agglomeration or destabilisation of the particles;
Stabilisation of silica particles that have undergone interfacial chemisorption, using surface active polymers such as pluronic tri-block co-polymers, for example P123 or F127 to form a stearic barrier; and
The slow diffusion of soluble silicate species generated from a silicate alkoxide (such as tetraethyl orthosilicate) monomer present in an aqueous basic dispersant toward the adsorbed silica surface, the rate of diffusion can be controlled by the strength of the surface potential and the temperature of the system.

Hydrolysing alkoxysilicates (such as TEOS) tend to diffuse across the interface of a stabilised dispersion of charged silica resulting in the growth of a less dense silica network by the diffusion-limited monomer-cluster kinetic growth mechanism [9,10].

Difunctional block co-polymers such as pluronic P123 or L121 or F-127 and the like are a class of surface active straight-chain polymers having a terminal hydroxyl (HO—) group at both ends of their poly-ethylene oxide blocks. This property makes the pluronic polymers ideal for steric stabilisation of silica particle interaction, especially for particles which are likely to be destabilised or agglomerated due to $V_A > V_R$ (where $V_A$ and $V_R$ are the attractive van der Waals and repulsive van der Waals forces respectively) between two spheres as the pluronic polymers can irreversibly attach to the surface of particles through van der Waals forces [11-13] mediated by the terminal hydroxyl groups. Previous studies [14-16] on the stabilisation of colloidal dispersions have demonstrated that particles in the colloidal size range, (1 nm-1000 nm) can be stabilised. Here, we have shown that silica particles with sizes above the colloidal range (≥1000 nm) can undergo indirect intermolecular hydrogen bonding with a tri-block co-polymer. Indirect hydrogen bonding between the difunctional pluronic tri-block co-polymer and dispersed silica occurs via the chemisorbed cationic alkyltrimethylammonium bromide (CTAB) hydrophobic tail. Under basic pH conditions, the hydroxyl (HO—) group at both ends of the tri-block co-polymer are deprotonated. The deprotonated hydroxyl group at one end of the tri-block co-polymer will interact with the hydrophobic tail of the chemisorbed CTAB via hydrogen bonding and the deprotonated hydroxyl group at the other end of the tri-block co-polymer will exert a repulsive barrier on the surrounding silica. This interaction will favour the growth of monodisperse silica spheres in solution. A dilute concentration of CTAB (for example between about $1\times10^{-3}$ to about $6\times10^{-3}$ Molar concentration) chemisorbed to the silica core surface assists in the formation of a porous shell layer from an alkoxide monomer.

As a result of the intermolecular interaction between the charged silica particle and a tri-block co-polymer (e.g. P123), a chemical environment is generated in which macromolecules (e.g P123) are present at the solid liquid interface of the charged non-porous silica particle. In such a chemical environment, the free energy at the surface of the stabilised silica particle has been modified resulting in a corresponding change in the rate of diffusion kinetics. When a source of monomer (e.g. TEOS) is added to the reaction mixture under basic pH conditions (>pH 7), the growth mechanism is directed toward a diffusion limited-monomer cluster mechanism. Under basic pH conditions (pH >7) the monomer (e.g. TEOS) can diffuse through an adsorbed layer of macromolecule (e.g CTAB, P123), to undergo hydrolytic polycondensation. As the condensation growth is limited to diffusion, a diffusion correlation mechanism of monomer (e.g. TEOS) across the solid-liquid interface of the adsorbed macromolecule (e.g. CTAB, P123) determines the physical structure of the particles. The less dense nature of a silica shell grown by the condensation reaction on the surface of a non-porous silica core is achieved due to the presence of an adsorbed surfactant macromolecule. This, results in the formation of an organised porous layer (shell) on the surface of the non-porous silica core. As this process is a growth mechanism, the growth thickness of the silica shell can be controlled by controlling the amount of monomer (TEOS) added. Therefore, the process enables the thickness of the silica shell to be controlled. It is possible to grow the silica shell to a thickness of several hundred nanometers for example up to about 1000 nm thick.

Chemical (Reaction) Kinetic of Seeded Growth

The polycondensation of alkoxysilicates in an aqueous-alcoholic solution under basic pH conditions (>7) will produce a compact dense structure of a non-porous silica particle (core). When core particles are dispersed in an aqueous solution under basic pH conditions, the silanols on the surface of the silica are deprotonated, resulting in an increase in the chemical potential at the surface of the particles as the surface charge changes from SiOH to SiO$^-$. Addition of an alkoxysilicates monomer (such as TEOS) at given time intervals to non-porous silica particles dispersed in a solution of ethanol, water and ammonia will cause the hydrolysing alkoxy silicate (e.g TEOS) to diffuse toward the deprotonated surface of the silica particles (known as the energy site). At the energy site, condensation will occur. Due to the close proximity at which condensation takes place, covalent bonds form between the surface of the silica core particles and the alkoxysilicates monomer resulting in a highly compact (dense) silica network of Si—O—Si bonds formed at the energy site. The change in entropy, ($\Delta$S), of the energy site (SiO$^-$) controls the growth mechanism of the silica shell and also the density of the condensation product formed. As $\Delta$S increases (i.e. at maximum) soluble (less dense) silicate alkoxides are converted to a highly dense and compact silica network (Si—O—Si) at the surface of a silica particle without the loss of the initial chemical potential. On silica surfaces having high multiple energy sites, the primary particle is condensed to a compact state, resulting in the growth of a core particle comprising a highly condensed non-porous silica structure provided that there is a continuous supply of alkoxysilicates monomer present. This type of particle growth is known as the seeded growth technique and is described in references 15 and 16 and U.S. Pat. No. 4,775,520.

Tri-block co-polymers such as P123 or F127 adsorbed at the surface of non-porous silica particles via indirect hydrogen bonding results in a change in the free energy ($\Delta$G), at the surface of the particles. This reduction in free energy at the surface of the particles (also considered as energy site) affects the kinetic growth process. We propose that in the case where an alkoxy silicate has to diffuse through an adsorbed layer of block co-polymer, the condensation product of the alkoxysilicate forms a less dense structure at the surface, $G_n > G_{ad}$ (where $G_n$ and $G_{ad}$ is the free energy at non-adsorbed silica surface and adsorbed silica surface respectively) whereas when hydrolysed alkoxysilicates diffuse through the layer of adsorbed block co-polymer, the alkoxysilicates have to compete with the adsorbed block co-polymer for energy/charged sites on the surface of the silica particle. We have observed that the growth rate of silica was faster with respect to mole of monomer specie present for hydrolysed alkoxysilicates which could account for the decrease in density observed for condensed silicate specie at the surface of dense non-porous silica particles. We believe that this is because the surface energy of the non-porous silica particle has been diminished as a result of adsorption of block co-polymer and as a result the available free energy is not sufficient to generate shorter polymeric covalent bonds. Thus, CTAB and tri-block co-polymer adsorbed at the surface serves as template to generate an ordered pore structure in the shell layer. When the resulting particles (core and shell) are calcined at a temperature above about 773 K (about 500° C.), the tri-block co-polymer is burnt off from the shell to form cavities (pores) in the shell of the particles. The resultant particle has a solid (non-porous) core and a porous shell layer.

The invention will be more clearly understood from the following examples.

EXAMPLES

Materials and Methods
Reagents and Chemicals

Tetraethyl orthosilicate>99.0%, octadecyltrimethylammonium bromide ($C_{18}$TAB) 97%, $EO_{20}$:$PO_{70}$:$EO_{20}$ (P123)-Av. Mol. Wt. 5800, $EO_{106}$:$PO_{70}$:$EO_{106}$ (F-127)-Av. Mol. Wt. 12600, Brij®-76-Av. Mol. Wt. 711; Ammonia Hydroxide (NH$_4$OH) solution-33% wt/wt, N,N-Dimethylformamide, 99.9%, Anhydrous decane>99.0%, trimethylbenzene (TMB) 98%, ammonium iodide-99.0% and chromatographic test mixes (all from Sigma Aldrich), Deionised water from Millipore Q water purifier (18.0 $\Omega$m), ethanol (Reagacon, Del.) was distilled over Mg/I, Methanol-reagent grade, Chloroform-reagent grade (all from Reagacon Ireland). Exsil-120™ silica powder (1.5 µm) from Exmere silica Engineering, UK. Methyl iodide ~99%, Poly(propylene glycol)bis(2-aminopropyl ether); O,O'-Bis(2-aminopropyl)polypropylene glycol-block-polyethylene glycol-block-polypropylene glycol (average mw—4,000), O,O'Bis(2-aminopropyl)polypropylene glycol-block-polyethylene glycol-block-polypropylene glycol (average mw=2000) were all purchased from Sigma Aldrich-Ireland. The synthesis of N$^+$(CH$_3$)$_3$:PO$_{68}$:N$^+$(CH$_3$)$_3$, and N$^+$(CH$_3$)$_3$:PO$_3$:EO$_{39}$:PO$_3$:N$^+$(CH$_3$)$_3$ was carried out by reacting methyl iodide with O,O'Bis(2-aminopropyl) polypropylene glycol-block-polyethylene glycol-block-polypropylene glycol (average mw=4000) and O,O'Bis(2-aminopropyl)polypropylene glycol-block-polyethylene glycol-block-polypropylene glycol (average mw=2000) in the presence of potassium carbonate.

Equipment

PTFE bottles (150, 250 mL), (Sigma Aldrich), Magnetic stirrer and hot plate with temperature control sensor (VWR International, UK), Micromeritics Gemini V BET surface area analyser (Particle and Surface science (UK) Ltd), Philips Xpert MPD diffractometer with Cu Kα radiation, JEM transmission electron microscopy (JEOL (UK) Ltd), JSM scanning electron microscopy (JEOL (UK) Ltd), dual piston pump, 20 mL slurry reservoir, Quick-Set pump control (SSI LabAlliance, IL. USA). Thermo Separation product (liquid chromatography) SpectraSYSTEM UV/vis detector, autosampler and quaternary pump using ChromQuest 3.0 for chromatograph data acquisition.

Example 1

Synthesis of Particles having a Mesoporous Shell Perpendicular to Spherical Non-porous Silica Surface Prior to the synthesis of the silica mesoporous shell, solid core non-porous silica seeds of 1.0 micron (SG_UC-#09) were synthesised according to methods described in literature [17].

Synthesis Method (i) SG_MS_04A 1.9 g of as-synthesized 1.0 µm spherical non-porous silica seeds (SG_UC-#09) were dispersed in a solution of 10 mL dry ethanol and 20 mL deionised water containing 0.08 g of $C_{18}TAB$ (6.8 mM) to form a sol. In a separate beaker, 1.65 g of P123 was dissolved in 30 mL deionised water and 15 mL dry ethanol. After complete dissolution of P123, the solution was mixed with the dispersed silica sol in a 150 mL PTFE bottle for 20 min, then 3.0 mL of ammonium hydroxide ($NH_4OH$) solution was added, followed by the addition of 1.2 mL TEOS. The mixture was allowed to react for 24 hrs under stirring. The silica particles formed were collected from the solution by centrifugation and resuspended in 6.8 mM $C_{18}TAB$ solution 20 mL deionised water containing and 10 mL ethanol. The growth process was repeated 15 times.

Following the 15$^{th}$ round of the growth process, a pore expansion protocol was performed to expand the pores in the shells as follows:

In a 150 mL beaker, 2.5 g of P123 and 2.5 g decane was dissolved using 30 mL of 2-propanol under stirring, after complete dissolution, 60 mL of deionised water containing 27 mg of ammonium iodide ($NH_4I$) was added and stirred for 30 min to form an oil-in-water emulsion system. The as synthesized silica particles were dispersed in the oil-in-water emulsion and transferred to a 150 mL PTFE bottle followed by the addition of 5 mL of $NH_4OH$ solution and stirred for 30 min. The solution was transferred to an oven for 12 h @ 80° C., followed by a temperature increase to 120° C. for 24 h.

The pore expanded seed growth mesoporous shell (SGMS) silica was washed and dried at 120° C. for 24 h prior to calcination at 600° C. at a ramp rate of 1° C. per min and held at a temperature 600° C. for 7 h to remove the surfactant (templating agent).

Synthesis Method (ii) SG_MS_04B

In this example, SGMS silica particles were synthesised in 12 h to investigate the effect of reducing the reaction time on shell growth.

1.9 g of 1.0 µm as-synthesized $SiO_2$ spherical non-porous silica seeds (SQ_UC-#09) were dispersed in a solution of 10 mL of dry ethanol and 20 mL of deionised water containing 0.08 g $C_{18}TAB$ to form a sol. The silica sol was sonicated for 10 min and transferred to a 150 mL PTFE bottle and stirred at 45° C. for 15 min, then 1.65 g of P123 in 15 mL dry ethanol and 30 mL deionised water was prepared and added to the silica sol with stirring for 15 min followed by the addition of 2.55 mL of 33% ammonia after which, 1.2 mL of TEOS was added. The reaction was completed after about 12 hrs. The silica particles were collected by centrifugation and re-dispersed in a solution containing 0.08 g $C_{18}TAB$.

In this example, 30 rounds of the growth step were performed to produce a particle with a diameter of 1.7 micrometer (i.e. 350 nm thick silica shell was grown).

The pore enlargement and calcination steps were performed as described above for the SG_MS_04A particles.

Syntheses Method (iii) SG_MS_04C

In this example the effect of reducing the concentration of ethanol in the CTAB solution that was used to form the sol was investigated. Decreasing the amount of ethanol will generally cause a decrease in the solubility of P123 surfactant which could result in a decrease in the density of the silica shell.

2.6 g of as-synthesized 1.0 µm spherical non-porous silica seeds (SG_UC-#09) were dispersed in a solution of 13 mL dry ethanol and 26 mL deionised water containing 0.10 g of $C_{18}TAB$ (6.8 mM) to form a sol. In a separate beaker, 1.97 g of P123 was dissolved in 40 mL deionised water and 20 mL dry ethanol. After complete dissolution of P123, the solution was mixed with the dispersed silica sol in a 150 mL PTFE bottle for 20 min, then 3.0 mL of $NH_4OH$ was added, followed by the addition of 1.2 mL TEOS. The mixture was allowed to react for 24 hrs under stirring. The silica particles formed were collected from the solution by centrifugation and resuspended in 6.8 mM CTAB solution. At each growth round, the CTAB solution had a 1.0 mL decrease in ethanol and 1.0 mL increase in water such that for the final (15$^{th}$) growth cycle, the CTAB solution contained water and no ethanol.

Following the 15$^{th}$ round of the growth process, the pores in the shells of the particles were expanded as described above for SG_MS_04A particles.

As shown in Table 1, we observed that several growth steps (up to 30 were required) to grow a shell thickness of up to 350 nm when the time of the stir reaction was reduced from 24 hours to 12 hours. Despite adding similar amounts of monomer, surfactant and ammonia unreacted monomers (TEOS) are still present in the reaction solution after the 12 hours reaction.

TABLE 1

| | seeded growth silica batches for mesoporous shell synthesis | | | | |
|---|---|---|---|---|---|
| sample batch | $C_{18}TAB/$ $SiO_2$ | $[NH_3]$ $(mol/dm^{-3})$ | P123/ $SiO_2$ | TEOS/ $SiO_2$ | Decane TMB |
| SG_MS_04A (synthesis method (i)) | 0.0064 | 0.75 | 0.009 | 0.125 @ 15x to 1.7 µm | 2.0 |
| SG_MS_04B (synthesis method (ii)) | 0.0064 | 0.75 | 0.009 | 0.125@ 30x to 1.7 µm | 2.0 |
| SG_MS_04C (synthesis method (iii)) | 0.0064 | 0.6 | 0.009 | 0.125@ 15x to 1.7 µm | 2.0 |

Synthesis Method (iv) SG_MS_04D

In this example, the concentration of the growing SGMS silica was kept constant relative to the volume concentration of reaction solvent. Note in the description of SG_MS_04A silica synthesis, the concentration of the reaction solvent remain constant as does the concentration of both surfactants (P123 and CTAB). However, the silica grows to a larger size (1.0 to 1.7 micron) in diameter; hence there is an increase in the mass fraction. An increase in the mass fraction of growing silica to a constant volume concentration is likely to cause agglomeration of particles. However in the presence of stabilising agent, such as P123, the SGMS tends to remain relatively unagglomerated. As an attempt to eliminate agglomeration, we increased the volume of reaction solvent relative to the constant concentration of component specie (e.g. CTAB and P123 etc.). As the volume of silica increase, the volume of reaction solvent also increases, the concentration of all other components was kept constant.

The reaction scheme follows the same general process as for SG_MS_04A above; however, the growth rounds were performed on three batches; the first was a 24 h per growth round reaction time and the second was 12 h per growth round and the third was 1 h. Table 2 details the mass and volume of all reaction components used in each growth round of the synthesis process for SG_MS_04D particles.

24 h Growth Round 2.2 g of as-synthesized 1.0 µm spherical non-porous silica seeds (SG_UC-#09) were dispersed in a solution of 12 mL dry ethanol and 24 mL deionised water containing 0.09 g of $C_{18}$TAB (6.8 mM) to form a sol. In a separate beaker, 1.87 g of P123 was dissolved in 34 mL deionised water and 17 mL dry ethanol. After complete dissolution of P123, the solution was mixed together with the dispersed silica sol in a 150 mL PTFE bottle for 20 min, then 2.9 mL of $NH_4OH$ was added, followed by the addition of 1.0 mL TEOS. The mixture was allowed to react for 24 hrs under stirring. The silica particles formed were collected from the solution by centrifugation and resuspended in 6.8 mM $C_{18}$TAB solution following the sequence in Table 2 below, the growth process was repeated 15 times. As shown in Table 2, the total volume is increased by 7.25 mL Following the $15^{th}$ round of the growth process, a pore expansion protocol was performed to expand the pores as follows:

4.21 g of P123 was dissolved in a 100 mL beaker with 62 mL of 2-propanol under stirring. 5.2 mL of cyclooctane was added and stirred for 15 min. In a different 250 mL beaker, 52 mg of $NH_4I$ was dissolved in 126 mL of deionised water. The surfactant and cyclooctane solutions were transferred to the beaker containing deionised water under stirring and allowed to emulsify for 1 h until a clear solution was formed.

The emulsion solution was used to disperse the as synthesized SGMS silica and transferred to a 250 mL PTFE bottle and stirred for 1 h at 35° C. and finally transferred to a pre-heated oven at 100° C. for 72 h. The calcination step was carried out as described above for SG_MS_04A particles to remove templating agents.

TABLE 2

A growth scheme for SG_MS_04D particles

| Growth round | mole. of TEOS added | g/mole (CTAB) | vol of CTAB sol (in 2:1, water:ethanol) | g/mole (P123) | vol P123 sol (in 2:1, water: ethanol) | vol ($NH_4OH$) | New particle diameter of SGMS silica (nm) |
|---|---|---|---|---|---|---|---|
| 1 | 0.0046 | 0.096 | 36 | 1.87 | 51.05 | 2.95 | 1068 |
| 2 | 0.0046 | 0.104 | 39 | 2.03 | 55.30 | 3.20 | 1128 |
| 3 | 0.0046 | 0.112 | 42 | 2.18 | 59.56 | 3.44 | 1185 |
| 4 | 0.0049 | 0.120 | 45 | 2.34 | 63.81 | 3.69 | 1243 |
| 5 | 0.0049 | 0.128 | 48 | 2.50 | 68.06 | 3.94 | 1299 |
| 6 | 0.0049 | 0.136 | 51 | 2.65 | 72.32 | 4.18 | 1352 |
| 7 | 0.0054 | 0.144 | 54 | 2.81 | 76.57 | 4.43 | 1408 |
| 8 | 0.0054 | 0.152 | 57 | 2.96 | 80.83 | 4.67 | 1462 |
| 9 | 0.0054 | 0.160 | 60 | 3.12 | 85.08 | 4.92 | 1514 |
| 10 | 0.0058 | 0.168 | 63 | 3.28 | 89.33 | 5.17 | 1569 |
| 11 | 0.0058 | 0.176 | 66 | 3.43 | 93.59 | 5.41 | 1621 |
| 12 | 0.0058 | 0.184 | 69 | 3.59 | 97.84 | 5.66 | 1672 |
| 13 | 0.0063 | 0.192 | 72 | 3.74 | 102.10 | 5.90 | 1725 |
| 14 | 0.0063 | 0.200 | 75 | 3.90 | 106.35 | 6.15 | 1777 |
| 15 | 0.0063 | 0.208 | 78 | 4.05 | 110.60 | 6.40 | 1827 |

12 h Growth Round

This synthesis method is similar as described for the 24 h growth round, here; the time was reduced to 12 h to investigate the effect of reaction time for complete growth. The growth scheme shown in Table 2 details the concentration characteristics of reactants and surfactant employed.

1 h Growth Round

This synthesis method is similar as described for the 24 h and 12 h growth round, here; the time was reduced to 1 h to investigate the effect of reaction time for complete growth. The growth scheme shown in Table 2 details the concentration reactants and surfactant employed.

We observed that the shell grows at a similar rate for the three different time periods growth rate rounds performed (24 hours, 12 hours, 1 hour) i.e. it took 15 growths round to reach a diameter of about 1.7 µm starting from a diameter of about 1.0 µm irrespective of the time of the growth step. The progressive increase in the volume of the dispersion solution is shown to be important in growing the silica shell.

Synthesis Method (v) SG_MS_04E

In this example we investigated whether a lower concentration of P123 had an influence on the monodispersity of particles.

This synthesis method is similar to the method used for SG_MS_04D particles above, for the 1 h per growth round reaction, the difference being that a lower concentration of P123 surfactant is used in the synthesis method of SG_MS_04E particles. The ratio of P123 of SG_MS_04D particles: P123 of SG_MS_04E particles=3:1 (i.e. the P123 g/mole in SG_MS_04D particles is three times more than for SG_MS_04E particles).

Table 3 below details the mass and volume of the reaction components of each growth round of the synthesis process of SG_MS_04E particles. We observed a significant agglomerations of the growing silica shell after the completion of the $15^{th}$ growth round at a rate of 1 h per growth round for the constant concentration of P123 and CTABr, i.e. increasing moles of P123 and CTABr

TABLE 3

A growth scheme for SG_MS_04E(1) particles

| Growth round | mole. of TEOS added | g/mole (CTAB) | vol of CTAB sol (in 2:1, water:ethanol) | g/mole (P123) | vol P123 sol (in 2:1, water:ethanol) | vol (NH₄OH) | New particle diameter of SGMS silica (nm) |
|---|---|---|---|---|---|---|---|
| 1 | 0.0046 | 0.096 | 36 | 0.62 | 51.05 | 2.95 | 1068 |
| 2 | 0.0046 | 0.104 | 39 | 0.68 | 55.30 | 3.20 | 1128 |
| 3 | 0.0046 | 0.112 | 42 | 0.73 | 59.56 | 3.44 | 1185 |
| 4 | 0.0049 | 0.120 | 45 | 0.78 | 63.81 | 3.69 | 1243 |
| 5 | 0.0049 | 0.128 | 48 | 0.83 | 68.06 | 3.94 | 1299 |
| 6 | 0.0049 | 0.136 | 51 | 0.88 | 72.32 | 4.18 | 1352 |
| 7 | 0.0054 | 0.144 | 54 | 0.94 | 76.57 | 4.43 | 1408 |
| 8 | 0.0054 | 0.152 | 57 | 0.99 | 80.83 | 4.67 | 1462 |
| 9 | 0.0054 | 0.160 | 60 | 1.04 | 85.08 | 4.92 | 1514 |
| 10 | 0.0058 | 0.168 | 63 | 1.09 | 89.33 | 5.17 | 1569 |
| 11 | 0.0058 | 0.176 | 66 | 1.14 | 93.59 | 5.41 | 1621 |
| 12 | 0.0058 | 0.184 | 69 | 1.20 | 97.84 | 5.66 | 1672 |
| 13 | 0.0063 | 0.192 | 72 | 1.25 | 102.10 | 5.90 | 1725 |
| 14 | 0.0063 | 0.200 | 75 | 1.30 | 106.35 | 6.15 | 1777 |
| 15 | 0.0063 | 0.208 | 78 | 1.35 | 110.60 | 6.40 | 1827 |

This experiment was repeated, but the mole concentration of CTAB was kept at a constant starting from the initial amount used. i.e. as the volume of the dispersion solvent increased, the mass of CTAB added on each growth round was essentially the same. Whereas, the P123 mole concentration was increased to match the concentration (mole/L) of the P123 in the increasing dispersion solution as shown in Table 4.

After the 15 growth round, the particle size had grown to about 1.7 µm with high degree of monodispersity and less agglomeration of particles.

TABLE 4

A growth scheme for SG_MS_04E(2) particles

| Growth round | mole. of TEOS added | g/mole (CTAB) | vol of CTAB sol (in 2:1, water:ethanol) | g/mole (P123) | vol P123 sol (in 2:1, water:ethanol) | vol (NH₄OH) | New particle diameter of SGMS silica (nm) |
|---|---|---|---|---|---|---|---|
| 1 | 0.0046 | 0.096 | 36 | 1.87 | 51.05 | 2.95 | 1068 |
| 2 | 0.0046 | | 39 | 2.03 | 55.30 | 3.20 | 1128 |
| 3 | 0.0046 | | 42 | 2.18 | 59.56 | 3.44 | 1185 |
| 4 | 0.0049 | | 45 | 2.34 | 63.81 | 3.69 | 1243 |
| 5 | 0.0049 | | 48 | 2.50 | 68.06 | 3.94 | 1299 |
| 6 | 0.0049 | | 51 | 2.65 | 72.32 | 4.18 | 1352 |
| 7 | 0.0054 | | 54 | 2.81 | 76.57 | 4.43 | 1408 |
| 8 | 0.0054 | | 57 | 2.96 | 80.83 | 4.67 | 1462 |
| 9 | 0.0054 | | 60 | 3.12 | 85.08 | 4.92 | 1514 |
| 10 | 0.0058 | | 63 | 3.28 | 89.33 | 5.17 | 1569 |
| 11 | 0.0058 | | 66 | 3.43 | 93.59 | 5.41 | 1621 |
| 12 | 0.0058 | | 69 | 3.59 | 97.84 | 5.66 | 1672 |
| 13 | 0.0063 | | 72 | 3.74 | 102.10 | 5.90 | 1725 |
| 14 | 0.0063 | | 75 | 3.90 | 106.35 | 6.15 | 1777 |
| 15 | 0.0063 | | 78 | 4.05 | 110.60 | 6.40 | 1827 |

To investigate if the low concentration of the P123 also contributed to the effect of the highly monodisperse particles formed, with highly uniform porous silica shell coating, we repeated the experiment using the higher amount P123 as described in Table 3, but kept the mass of CTABr added in the dispersion solution constant as described in Table 5.

The final particle size after the 15$^{th}$ round of growth per 1 h growth reaction was 1.7 µm. Particles were highly monodisperse with a uniform shell thickness. This indicates that P123 in the dispersion solution does not cause particle agglomeration within the concentration range studied which is in contrast to the CTABr. In this regard, we propose that the purpose of the P123 is to prevent a binary phase system occurring in the oil-in water emulsion system. P123 also enhances the formation of micelles. Ammonium iodide (NH₄I) helps to promote penetration of the organic micelle into the pore of the shell which is subsequently expanded by hydrothermal treatment. We observed that there was a remarkable increase in the pore expansion achieved using cyclooctane, rather than decane, as a pore expander for SG_MS_04D particles. A possible explanation for this observation is that cyclooctane is more soluble than decane. In the oil-in-water emulsion system created, cyclooctane is fairly stable in the alcohol-aqueous solution, hence during the hydrothermal treatment, cyclooctane will be a more effective pore expander since it is present in a single phase system in the emulsion. In the case of decane, due to its high immiscible properties in the water, at the concentration used it forms a two phase system that will separate from the liquid where the SGMS silica particles are present. During the hydrothermal treatment, decane will not expand the pores of the SGMS effectively, because a two-stage phase has been formed and as such the decane is not present in the liquid system containing dispersed silica shell particles. Any pore expansion that occurs from the emulsion system created using decane could be due to high temperature effect of the liquid system rather than the decane.

Synthesis Method (vi) SGMS-04F: Synthesis of Core-shell Silica Particles: Increasing Volume of Reaction Solvent Progressively—1 h Batch SGMS We investigated a synthesis approach to produce smoother and more monodisperse particles. Following our observations from the synthesis methods (i) to (v), we had an understanding that it is important that the surfactant is present at an optimum concentration to produce a smoother and more monodisperse particle. In this synthesis method, a reaction scheme that is similar to the SG_MS_04D, reaction was developed, but the initial mole concentration of surfactant templates (CTABr and P123) was kept constant through-out all of the growth rounds. This means that as the silica grows the concentration in mole/L of fresh surfactant decreases because; the silica dispersion solution is increased progressively. The volume of reaction solvent needs to be increased as the particles grow to increase the separation distances of particles in solution, thus minimizing agglomeration.

We propose that the solvent dipole may be lowered if adsorbed CTABr at the surface forms a bilayer aggregation and also the volume of reaction solvent increases while the mole concentration of surfactant remains constant in particular with the P123 block-co-polymer i.e. a reduction in the concentration of P123. This will promote faster diffusion of monomer specie to charged surface, thus considerably reducing the reaction time needed to produce the same growth mechanism and growth rate.

Stage A: 1.7 μm Core-shell (350 nm Porous Shell)

A 1.9 g of as synthesized, non-porous silica spheres (seed) were dispersed in a solution of 24 mL ethanol and 48 mL of deionised water. After 10 min sonication, the silica sol was transferred to a 250 mL PTFE bottle and allowed to stir at 45° C. for 15 min, and then 3.6 mL of 32.5% of ammonia was added. A surfactant solution containing 0.128 g $C_{18}$TABr and 2.64 g of P123 in 15 mL dry ethanol and 29.4 mL deionised water was prepared and added to the silica sol under stirring. After 20 min of stirring, 0.82 mL of TEOS was added.

After a 1 hour reaction, the silica dispersion was centrifuged to retrieve the grown silica a small portion (about 5 mg) of silica was removed after each reaction round and analysed for particle size increase and corresponding size distribution using dynamic light scattering (DLS) techniques.

Repeatedly, the subsequent growth silica collected is re-dispersed in solution as described above and the corresponding concentration of TEOS is added to grow the porous shell layer until a particle diameter of about 1.7 μm is achieved.

Stage B: Hydrothermal Pore Treatment

After the SGMS growth synthesis was complete, the hydrothermal pore treatment was carried out primarily to strengthen the pore structure formed by the templated surfactant. In a typical treatment, the resultant SGMS silica was centrifuged to collect the solid silica and resuspended in a solution of 180 mL of water. The suspended silica was placed on the oven for 72 h at 110° C. After hydrothermal treatment was complete, the silica was washed with deionised water several times and collected in crucible and dried for 48 h at 110° C.

Stage C: Calcination

The dried silica was calcinated at 600° C. to burn off the templated surfactant to generate pores.

The calcination was performed in a furnace by ramping up the temperature at 5° C./min to 600° C. and the particles were held at this temperature for 18 h. Finally the furnace was turned off and allows temperature to cool down to room temperature.

Table 5 below describes the process of the silica growth including TEOS and reagent added at each round of reaction.

TABLE 5

A growth scheme for SG_MS_04F particles

| Silica Shell Dispersion EtOH:H$_2$O (mL) | Surfactant Solution EtOH:H$_2$O (mL) | NH$_4$OH (32.5%) (mL) | P123:C$_{18}$TABr (g) | TEOS Vol. (mL) | DLS (μm) |
|---|---|---|---|---|---|
| 24:48 | 15:29.4 | 3.6 | 2.64:0.128 | 0.82 | 1.08 |
| 25:50 | 15:29.3 | 3.7 | | 0.82 | 1.15 |
| 26:52 | 15:29.2 | 3.8 | | 0.82 | 1.23 |
| 27:54 | 15:29.1 | 3.9 | | 0.92 | 1.28 |
| 28:56 | 15:29.0 | 4.0 | | 0.92 | 1.35 |
| 29:58 | 15:28.9 | 4.1 | | 0.92 | 1.41 |
| 30:60 | 15:28.8 | 4.2 | | 1.02 | 1.46 |
| 31:62 | 15:28.7 | 4.3 | | 1.02 | 1.52 |
| 32:64 | 15:28.6 | 4.4 | | 1.02 | 1.58 |
| 33:66 | 15:28.5 | 4.5 | | 1.12 | 1.63 |
| 34:68 | 15:28.4 | 4.6 | | 1.12 | 1.65 |
| 35:70 | 15:28.3 | 4.7 | | 1.12 | 1.69 |
| 36:72 | 15:28.2 | 4.8 | | 1.22 | 1.73 |
| 37:74 | 15:28.1 | 4.9 | | 1.22 | 1.78 |
| 38:76 | 15:28.0 | 5.0 | | 1.22 | 1.81 |

Synthesis Method (vii) SGMS-04G—Synthesis of Core-Shell Silica Particles: Preparation of Larger Pore Sizes This method was devised to synthesise particles with ultimately explores large pores required for fast chromatography separation.

1.9 g of as-synthesized, non-porous silica spheres (seed) were dispersed in a solution of 24 mL ethanol and 48 mL of deionised water. After 10 min sonication, the silica sol was transferred to a 250 mL PTFE bottle and allowed to stir at 45° C. for 15 min, and then 3.6 mL of 32.5% of ammonia in water was added. A surfactant solution of concentration between 0.0001 to 0.001 mole of $C_{18}$TABr typically 0.00033 mole and 0.00017 to 0.0017 mole of P123, typically 0.00046 mole; both in 15 mL dry ethanol and 29.4 mL deionised water was prepared and added to the silica sol under stirring. After 20 min of stirring, 0.82 mL of TEOS was added and allowed to react for 1 hour.

After the 1 hour reaction, the silica dispersion was centrifuged to retrieve the grown silica; small portion (about 5 mg) of silica was removed after each reaction round and analysed for particle size increase and corresponding size distribution using dynamic light scattering (DLS) techniques.

Repeatedly, the subsequent growing silica particles collected is re-dispersed in solution as described above (with increasing volume of reaction solvent by 3-6 ml increase per growth round leading to a final volume increase of 45 to 90 mL) and the corresponding concentration of TEOS is added to grow the porous shell silica layer until a particle diameter of about 1.7 μm was achieved.

Stage B: Hydrothermal Pore Treatment

After the SGMS growth synthesis was complete, the hydrothermal pore treatment was carried out primarily to strengthen the pore structure formed by the templated surfactant. In a typical treatment, the resultant SGMS silica was centrifuged to collect the solid material and dispersed in 180 mL of water. The silica suspension was placed in an oven 72 h at 110° C. After hydrothermal treatment was complete, the silica was washed with deionised water several times and transferred to a crucible and dried for 24 h at 110° C.

Stage C: Calcination

The dried silica was calcinated at 600° C. to burn off the templated surfactant to generate pores.

The calcination was performed in a furnace by ramping up the temperature at 5° C./min to 600° C. and the particles were held at this temperature for 18 h. Finally the furnace was turned off and allows temperature to cool down to room temperature.

Stage D: Chemical Pore Expansion

To achieve the desired pore size that will enhance rapid separation when the particles are used as a packing material for liquid chromatography, the pore size of the porous shell employed as the solid core. Nine growth round was performed to produce the 250 nm shell thickness.

For the preparation of 500 nm porous silica shell, the non-porous silica having particle diameter of 0.7 µm was employed as the solid core. Twenty one growth round was performed to produce the 500 nm shell thickness.

The hydrothermal treatment, calcination and chemical pore expansion was done as described in synthesis method (vii).

TABLE 6

Particle Characterisation of different SGMS with sizes in solid core and porous shell thickness.

| Silica (nonporous) core particle diameter (µm) | Shell thickness (nm) | Pore size before hydrothermal expansion (Å) | Pore size after hydrothermal expansion (Å) | Pore size after pore treatment using $H_2O_2$ and $NH_4OH$ (Å) | BET Surface area (m²/g) after pore treatment |
|---|---|---|---|---|---|
| 0.7 | 500 | 28 | 40 | 120 | 350 |
| 1.0 | 350 | 28 | 40 | 90 | 205 |
| 1.25 | 250 | 28 | 40 | 90 | 150 |
| 1.5 | 100 | 28 | 40 | 80 | 100 | must be expanded above 60 Å and to a maximum of 300 Å, typically 90 Å pore size was suitable for most separation application.

6.75 g calcinated SGMS was disperse in a solution of 75.6 mL deionised water and placed in a heating oil to bring the temperature to 75° C. under stirring, then a mixture of 14.4 mL (5.0 wt %) aqueous ammonia and 0.56 mL (0.2 wt %) of hydrogen peroxide ($H_2O_2$) was added via a glass syringe under stirring. The slurry was allowed to etch for 8 h; followed by series of washing with de-ionized water and finally with methanol. The etched silica was dried in an oven at 150° C. for 24 hours.

In another experiment, longer etch time (16 h) was used, using identical concentration of ammonia and hydrogen peroxide this yielded much larger pores up to about 120 Å.

After etching, a SEM image (FIG. 5c) reveals that the particle structure remains intact; however nitrogen sorption analysis (BET) indicates an increase in pore size and decrease in surface area as shown in Table 8.

Synthesis Method (viii) SGMS-04H: Preparation of Silica with Different Shell Thickness From the SGMS A to F (method i to vi above), silica shell thickness of 100 nm and 250 nm was also prepared, However to keep the total particle size identical (1.7 µm), the silica core (non-porous) particles of 1.5 µm were used as the starting seed to grow 100 nm shell thickness and 1.25 µm non porous particles were use as the starting seed to grow 250 nm shell thickness. Using the 1 h per growth round, 4 repeated layer-by-layer growths produced 100 nm shell thickness on a 1.5 µm core and 9 repeated layer-by-layer growth produced the 250 nm shell thickness on a 1.25 µm core.

In a similar manner, a 500 nm shell thickness was grown on a 700 nm solid core silica particles, using 21 repeated layer-by-layer, 1 h growth rate steps. The particle characteristics are shown below in Table 6:

The following method for preparing the silica shell with different thickness is similar to synthesis method (vii), using different sizes of nonporous silica core and different number of growth steps: p For the preparation of 100 nm porous silica shell, the nonporous silica having particle diameter of 1.5 µm was employed as the solid core. Four growth round was performed to produce the 100 nm shell thickness.

For the preparation of 250 nm porous silica shell, the non-porous silica having particle diameter of 1.2 µm was Example 2

Electron Microscopy Imaging of SGMS Silica

From the results obtained it can be seen that the shell accounted for some degree of solid core modification.

Figure 2:
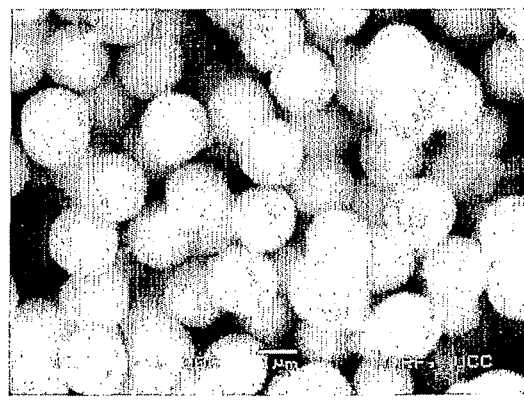
FIG. 2 is a scanning electron micrograph image of the microparticles of FIG. 1.

Electron microscopy of the SGMS silica particles was carried out using a JSM-5510 Scanning electron microscopy (SEM) at 19 kV equipped with a control user interface image acquisition for scanning mode. To image the bi-layer of non-porous-porous shell, it was necessary to image in the transmission mode and for this a JEM-2000FX transmission electron microscopy (TEM) equipped with Megaview™ ANALY soft imaging system (ANALYsis) was used. Referring to FIG. 1 (TEM image), the non-porous silica core can be seen as a dense darker section which is surrounded by a less dense porous silica shell layer. From FIG. 2 which is a scanning electron micrograph (SEM) image of the SG_MS_04A particles, it can be seen that the particles are substantially spherical in shape on a three dimensional view.

Figure 15:
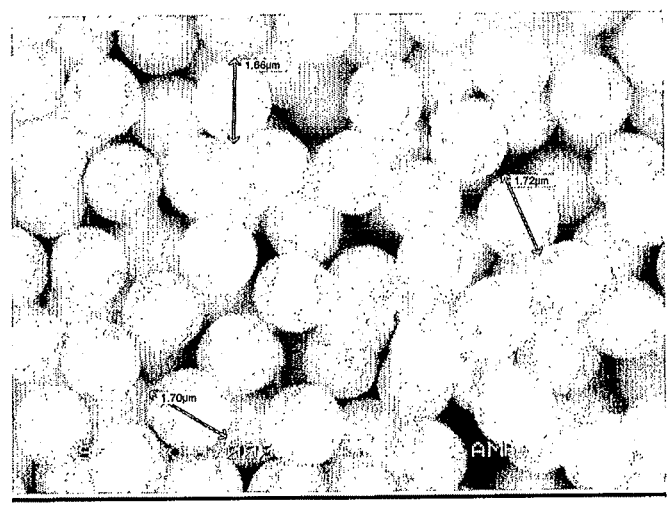
FIG. 15 is a scanning electron micrograph image of the microparticles synthesised according to Example 1 (SGMS-04E) in synthesis method vi.
Figure 16:
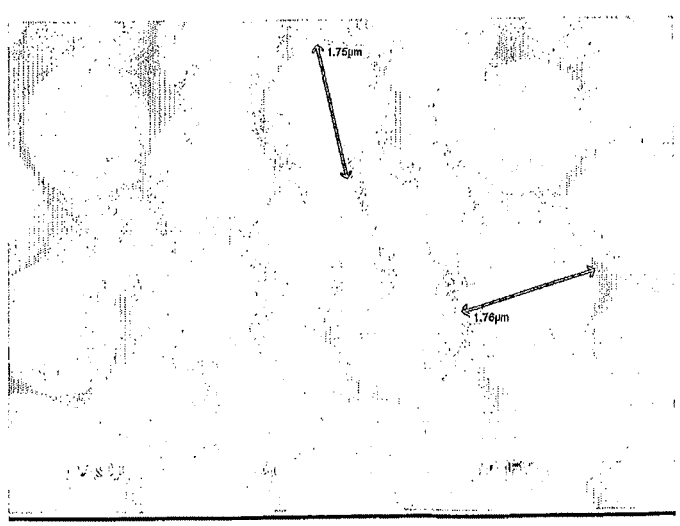
FIG. 16 is a scanning electron micrograph image of the microparticles synthesised according to a repeat of Example 1 (SGMS-04F) in synthesis method vi.
Figure 17:
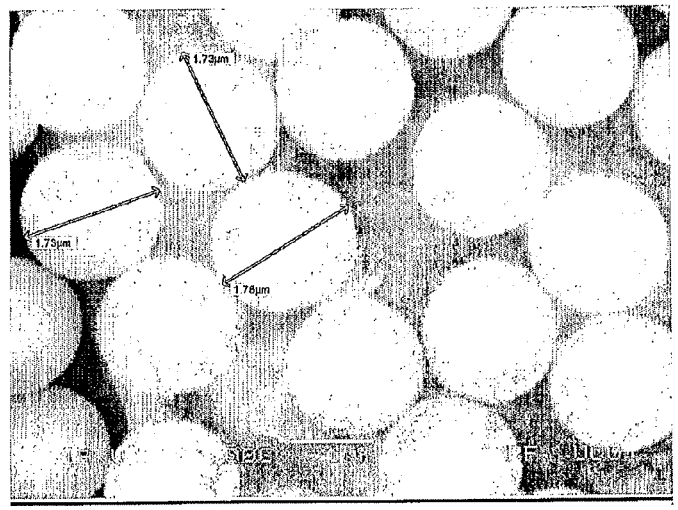
FIG. 17a is a high magnification scanning electron micrograph image of the microparticles synthesised according to Example 1 (SGMS-04G) in synthesis method vii.
FIG. 17b is a low magnification scanning electron micrograph image of the microparticles synthesised according to Example 1 (SGMS-04G) in synthesis method vii.
Figure 17:
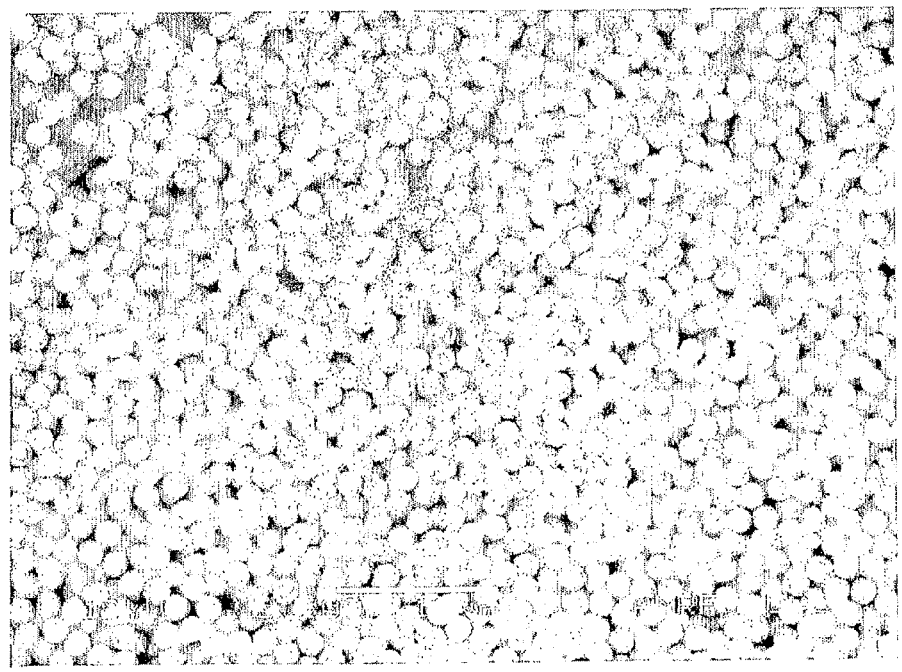

SEM images for 1 hour growth round rate SGMS reveals that the particles are monodisperse and discrete with high sphericity (FIGS. 15 and 17). Smaller fines observed in FIG. 2, that are known to deteriorate chromatographic efficiency, were completely eliminated.

Figures 18A, 18B:
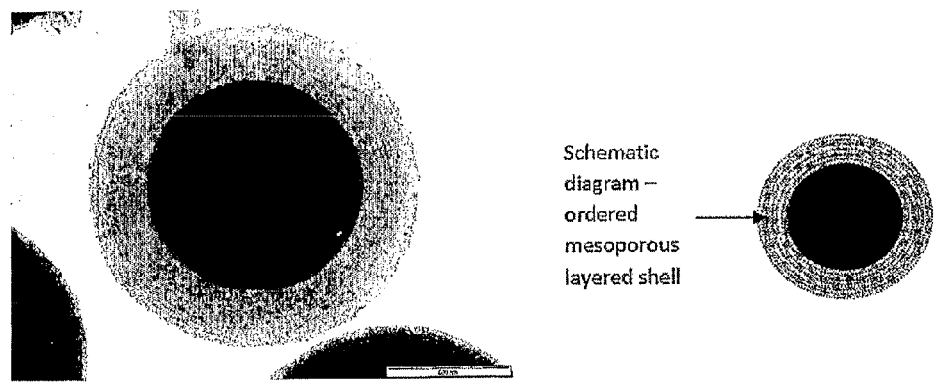
FIG. 18a is a transmission electron micrograph image of the microparticles synthesised according to Example 1 (SGMS-04G) in synthesis method vii, revealing the true morphological geometry as core-shell silica particles with large pore size.
FIG. 18b is a schematic diagram of the microparticles with an ordered mesoporous layered shell.

A detailed image of the large pore SGMS silica particle is shown in FIG. 18, here it can be clearly seen that the porous shell is sufficiently thick to house sufficient analytes mass load to improve the chromatography retention factor of the particle.

Example 3

BET Surface Area, Pore Size and Pore Volume Characterisation

Figure 3:
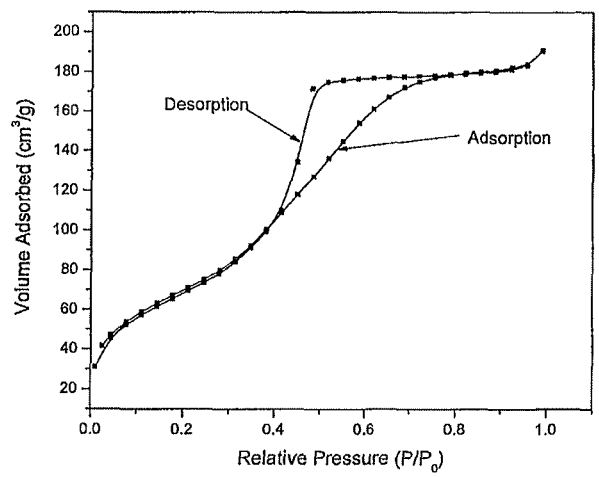
FIG. 3A is a graph showing the BJH adsorption and desorption isotherms of microparticles (SG_MS_04A) prepared by a process of the invention.
FIG. 3B is a graph showing the BJH adsorption pore size distribution (PSD) of microparticles (SG_MS_04A) prepared by a process of the invention.
Figure 3:
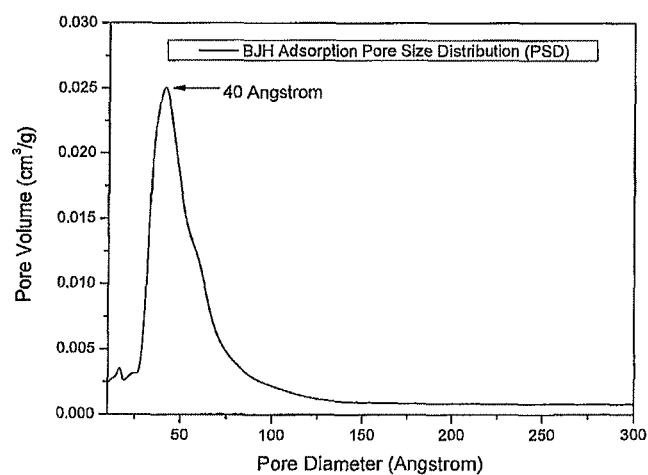
Figure 4:
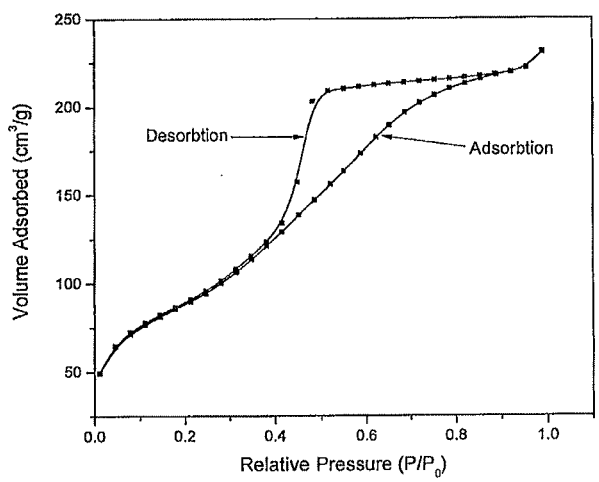
FIG. 4A is a graph showing the BJH adsorption and desorption isotherms of microparticles (SG_MS_04B) prepared by a process of the invention.
FIG. 4B is a graph showing the BJH adsorption pore size distribution (PSD) of microparticles (SG_MS_04B) prepared by a process of the invention.
Figure 4:
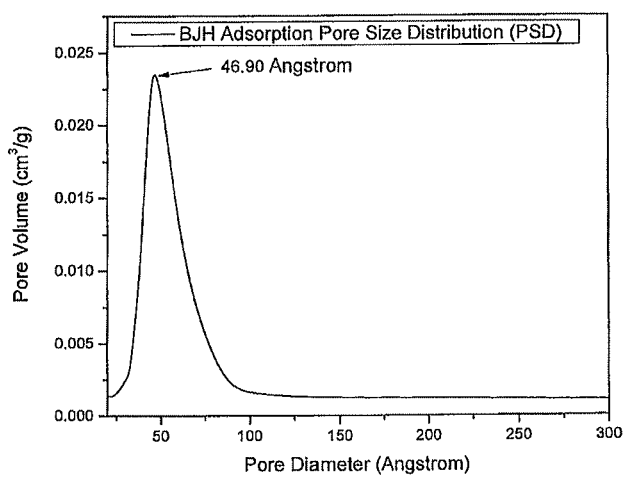

The mesoporous shell silica (SQ_MS_04A, 04B, 04C, 04D and 04E) and the non-porous silica (SG-UC-#09) were separately characterised for specific surface area (SSA), specific pore volume (SPV) and adsorption-desorption average pore diameter ($APD_{ads,des}$) using the multipoint nitrogen sorption technique to measure a complete adsorption-desorption isotherm (as shown in FIGS. 3A, 4A and 5A for SQ_MS_04A, B and C respectively) on a Micrometrics Gemini 2375 surface area analyser as follows: the SSA of the SGMS was calculated using the BET method, the SPV was measured at a single point for P/Po>0.99, the estimation of micropore was measured using the t-plot method, BJH adsorption pore size distribution (PSD) was used to measure $APD_{ads}$ and the BJH desorption pore size distribution (PSD) was used to measure $APD_{des}$. Unless otherwise stated the pore diameter or pore size is based on the $APD_{ads}$ measured from the BJH adsorption PSD as shown in FIGS. 3B, 4B and 5B for SG_MS_04A, B and C respectively.

Figure 19:
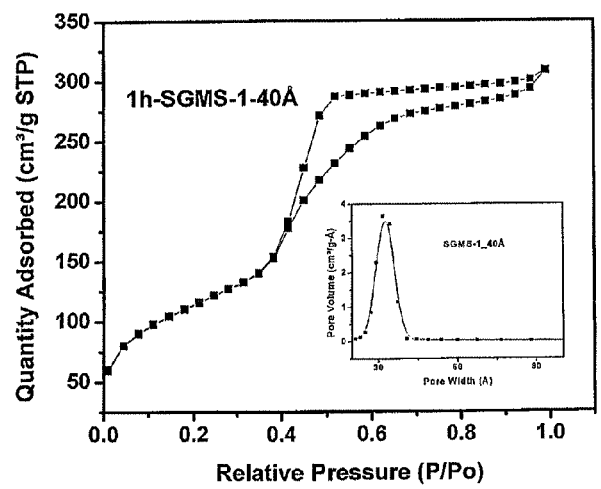
FIG. 19 is a graph showing the BJH adsorption pore size distribution (PSD) of microparticles (1h-SGMS-1-40), showing inset of BJH desorption particle size distribution prepared by a process of the invention.
Figure 20:
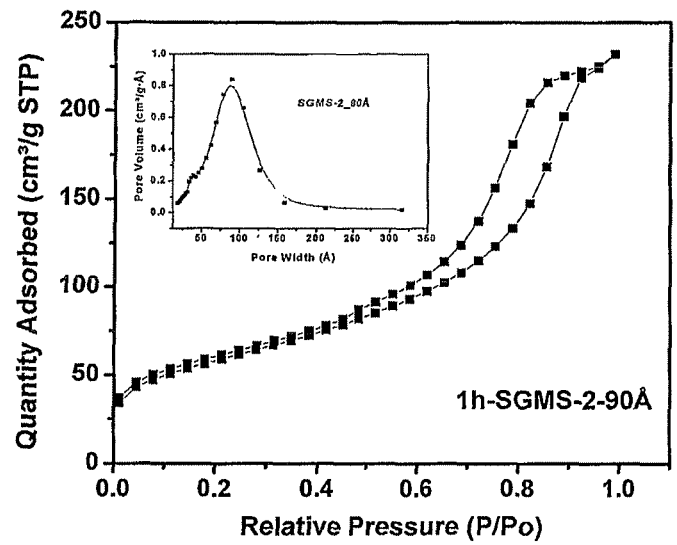
FIG. 20 is a graph showing the BJH adsorption pore size distribution (PSD) of microparticles (1h-SGMS-2-90), showing inset of BJH desorption particle size distribution prepared by a process of the invention.
Figure 21:
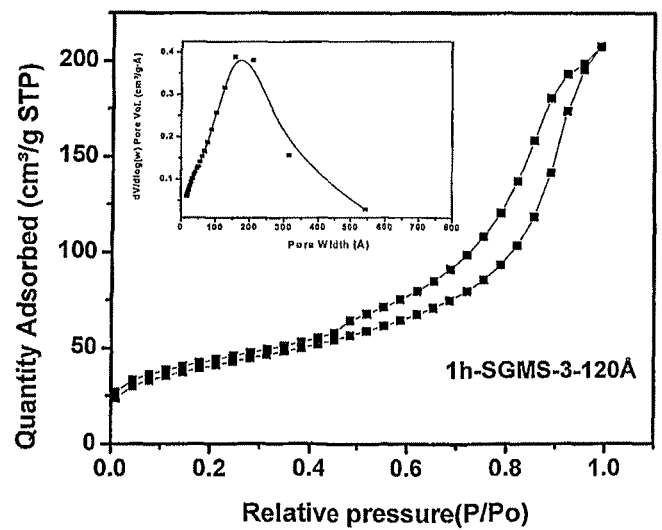
FIG. 21 is a graph showing the BJH adsorption pore size distribution (PSD) of microparticles (1h-SGMS-3-120), showing inset of BJH desorption particle size distribution prepared by a process of the invention.
Figure 22:
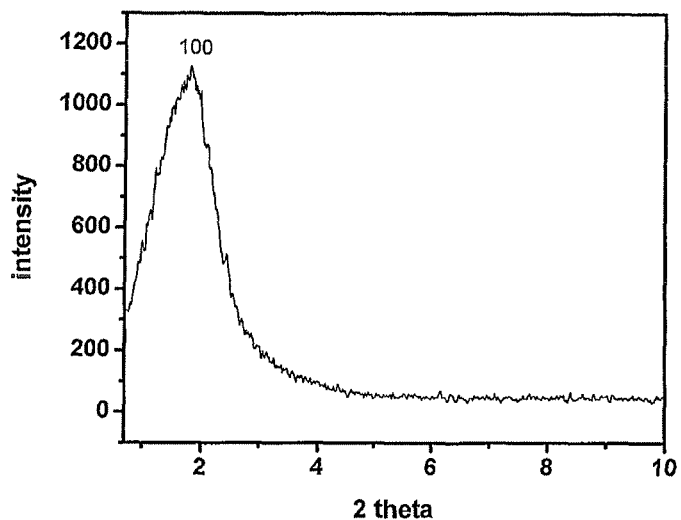
FIG. 22 is graph showing the X-ray diffraction from 1h-SGMS-1-40 microparticles.

FIGS. 19 to 21 show the BET isotherm for the 1 h growth rate SGMS having different final pore sizes. These figures demonstrate that the surface area and pore size of particles can be specifically tailored to suit different chromatography kinetics using the methods described herein.

Figure 7:
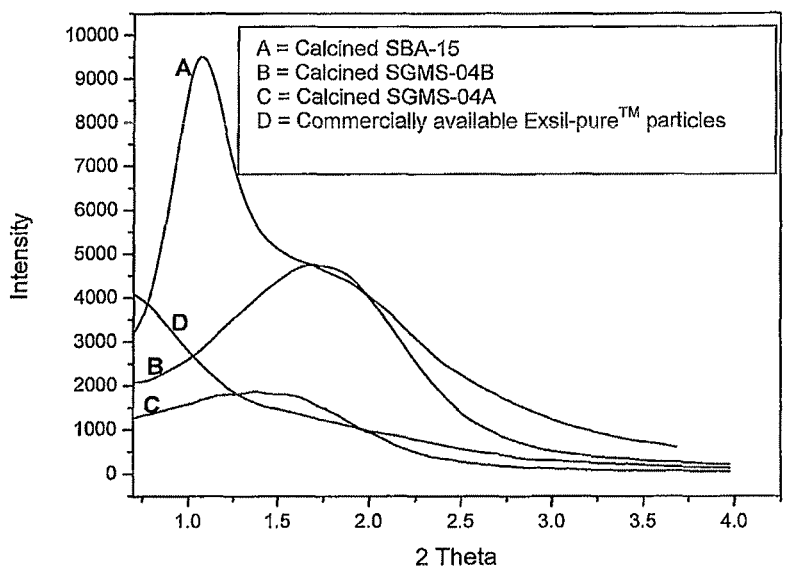
FIG. 7 is graph showing the X-ray diffraction from SG_MS_04 microparticles and a commercially available totally porous microparticle (Exsil-pure™)
Figure 23:
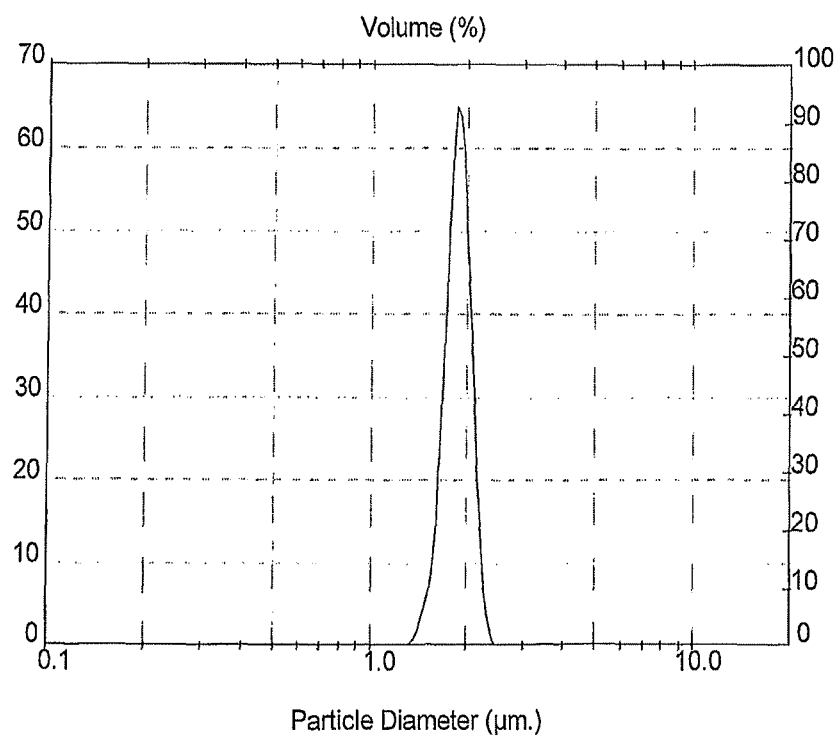
FIG. 23 is a graph showing particle size distribution of particles prepared in accordance with Example 6.

Referring to Table 7 below, the properties of SG_MS_04 particles are compared with the properties of a commercially available particle (Exsil-120™) and a non-porous particle (SG_UC-#09) which act as the substrate (core) onto which the silica shell layer is synthesised. SG-UC-#09 is a 1.0 µm non-porous silica synthesised in our lab by the seeded growth technique which is previously described in reference 16 and is used as the solid core non-porous silica particle in the process described herein.

powdered was placed on a sample disk, thin a fine glass plate was used to form a smooth surface. The sample disk containing the sample was placed on the sample stage followed by a continuous XRD scan from 0.7 to 3.9 (2 theta angle). The scan was carried out on four selected samples as shown in FIG. 7. The particle size distribution as shown in FIG. 23, demonstrates that the particle sizes are uniform with a mean particle size of about 1.73 µm±about 0.01 µm.

Example 5

Silanization and Elemental Analysis (CHN) of as Made Mesoporous Shell Silica (1.7 µm) and Exsil-pure 120™ Pure Totally Porous Silica (1.5 µm)

Prior to the silanization reaction, a batch of SG_MS_04A, (1.7 g) and a batch of commercially available Exsil-120™ pure totally porous silica (1.7 g) were separately re-hydroxylised in a 5.0 mole/litre hydrochloric acid at a reflux temperature of 120° C. for 12 h; the silica was washed several times in water and finally methanol and placed in a cruicible to dry overnight at 150° C.

TABLE 7

Material characterisation data from SG_MS

| Sample | Surface Area ($m^2/g$) | Pore Volume (cc/g) | Unit cell parameter $a_0^b$ (Å) | d spacing (Å) | Wall thickness (Å) | $APD_{ads}$ (Å) |
|---|---|---|---|---|---|---|
| SG_UC-#09 | 0.03 | 0.0025 | — | — | — | — |
| SG_MS_04A (1.7 µm) | 258 | 0.38 | 74.02 | 64.1 | 34.02 | 47 |
| SG_MS_04B | 312 | 0.36 | 67.67 | 58.6 | 20.7 | 40 |
| SG_MS_04C | 270 | 0.37 | — | — | — | 57 |
| SG_MS_04D | 103 | 0.21 | — | — | — | 80 |
| SG_MS_04E | 218 | 0.22 | — | — | — | 47 |
| Exsil-120 ™ pure porous $SiO_2$ (1.5 µm) | 230 | 1.02 | — | — | — | 120 |

TABLE 8

Physical characterisation properties of seeded growth mesoporous silica (core-shell) particles synthesized.

| sample batch | Shell thickness (nm) | Pore size before hydrothermal expansion (Å) | Pore size after hydrothermal expansion (Å) | Pore size after pore treatment using $H_2O_2$ and $NH_4OH$ (Å) | BET Surface area ($m^2/g$) after pore treatment |
|---|---|---|---|---|---|
| 24h-SGMS | 350 | 28 | 40 | — | 300 |
| 12h-SGMS | 350 | 28 | 40 | — | 330 |
| 12h-SGMS-1:3 | 70 | — | — | — | 250 |
| 12h-SGMS-1:1 | 350 (Agg) | — | — | — | 350 |
| 1h-SGMS-1 | 350 | 28 | 40 | — | 390 |
| 1h-SGMS-2 | 350 | 28 | 40 | 90 | 205 |
| 1h-SGMS-3 | 350 | 28 | 40 | 120 | 145 |

Example 4

Powdered X-ray Diffraction of as-Synthesized SGMS (1.7 µm) and Commercial Silica (1.5 µm)-Exsil-pure™

Low angle powdered X-ray diffraction (LAPXRD) was carried out using the Philips Xpert MPD diffractometer with Cu Kα radiation (40 Kv, 35 mA) as follows: Dried silica Silanization Process:

An identical Silanization reaction was carried for both (SG_MS_04A and Exsil-pure 120™) silica material as follows:

1.5 g of the re-hydroxylated batches of silica (SG_MS_04A and Exsil-pure 120™) were separately poured into a three necked round bottom flask, equipped with a drying tube, a reflux condenser and a separatory funnel. 20 mL of dry toluene and a 2.5 cm magnetic stirring bar were added to the flasks containing the silica material (SG_MS_04A and Exsil-pure 120™). The flasks were placed in a preheating oil bath which was kept on top of a hotplate-magnetic stirrer and the toluene was allowed to reflux at 130° C. for 15 min under stirring. Then 0.27 g (0.00389 mole) of imidazole was added into the refluxed toluene under stirring, after 15 min, 1.35 g (0.00389 mole) of n-octadecyldimethylchlorosilane in 5 mL dry toluene was added dropwise via the separatory funnel over 3 min. The reaction was allowed to proceed according to the method described elsewhere[18]. After cooling, the silica was filtered from the toluene solution; some flakes of imidazole hydrochloride were seen on top of the filtrate so the filtrate was washed with 50 mL methanol, 50 mL methanol:water (50:50) and finally 50 mL methanol to remove all unbound material and imidazole hydrochloride salt. Finally the silica was allowed to dry under in a vacuum desicator for 2 h.

To ensure total removal of all unbound chlorine material, the silicas were treated with tetrahydrofuran (THF). The silanized silica product obtained was transferred to a 100 mL 3 necked flask and 30 mL of THF and 2.5 cm stirring bar were added to the flask and the suspension was stirred for 15 min in a hot oil bath at 80° C. After removal from the hot oil bath, the suspension was allowed to cool and filtered, followed by washing with 50 mL THF and 50 mL methanol. Finally, the silica was dried in a desiccator under vacuum for 24 h. A small amount of the silanized dried silica was sent for CHN microanalysis and results are shown below in Table 9.

TABLE 9

CHN microanalysis

| Sample | C % | H % | Specific surface area (m²/g) | μmole/m² |
|---|---|---|---|---|
| SG_MS_04A_1.7 μm | 9.45 | 1.8 | 258 | 2.58 |
| Exsil-120 ™ pure totally porous 1.5 | 8.55 | 1.08 | 230 | 2.35 |

Figure 24:
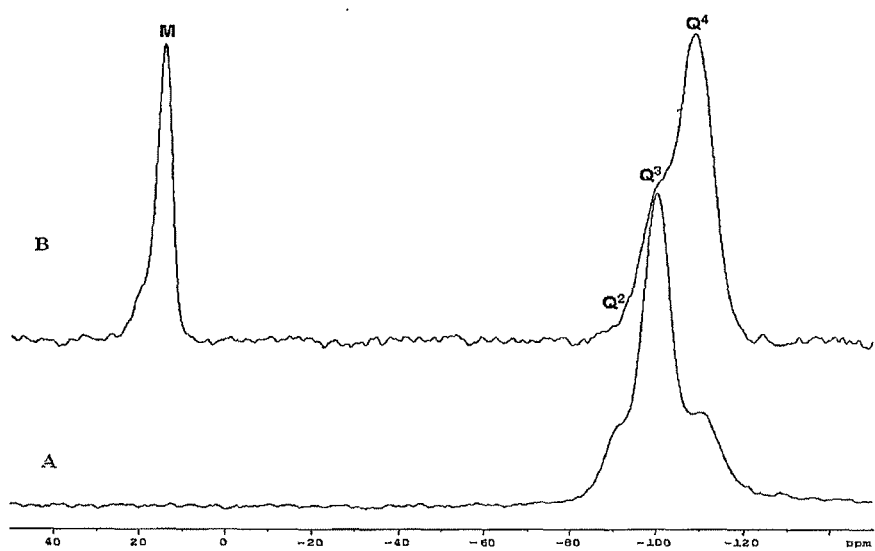
FIG. 24 (A) is a $^{29}$Si CPMAS NMR of native SGMS-1 showing the chemical environment of silica including $Q^2$, $Q^3$ and $Q^4$ peaks indicating presence of various silanols. (B) is a $^{29}$Si CPMAS NMR of functionalised SGMS-1C8 silica particles showing a reduced signal of $Q^3$ and $Q^2$ species. The M specie indicates chemical bonding of the C8 ligand.

$^{29}$Si Solid state NMR characterisation was employed to investigate the chemical environment of rehydroxylated SGMS silica particles; as shown in FIG. 24A, the large signal of the $Q^3$ peak intensity indicates the SGMS has homogenous surfaces of free hydroxyl (Si—OH) groups. FIG. 24B shows the $^{29}$Si solid state NMR of SGMS silica particles after C8 grafting for reversed phase LC. The M peak indicates monofunctionality of the C8 attachment onto the silica surfaces, indicating chemical bonds.

Example 6

Column Packing & Chromatography Data of Derivatised as Made Mesoporous Shell Silica (1.7 μm) and Exsil-120™ Pure Porous Silica (1.5 μm)

Slurry packing was successfully carried out in our laboratory. The packing instrument consists of a dual piston pump with head pump of 10 mL (SSI LabAlliance, IL. USA) and 20 mL slurry reservoir. The pump is wholly electrically operated. Flow rate and pressure is monitored via Quick-Set pump control software (SSI LabAlliance, IL. USA). For all columns packed in-house, the slurry solvent was methanol:chloroform (50:50), packing solvent was 100% methanol. Packing of all chromatography columns was carried out under a constant pressure of 9500 psi and variable flow rate from 5 to 17 mL/min.

A comparison of the chromatographic performance of SG_MS_04A_1.7 μm (1.0 μm as solid core and 0.35 μm as mesoporous shell) and the commercially available Exsil-120™ pure totally porous $SiO_2$ (1.5 μm) was performed. Both silicas were packed in-house in a 4.6×50 mm stainless steel column tube according to the following protocol:

0.85 g of the silanized silicas were dispersed in a 20 mL slurry solvent made of (50:50) methanol:chloroform; first a glass spatula was used to break the particles into slurry followed by 10 min of sonication vibration to evenly disperse the silica in the slurry solvent (methanol:chloroform). The silica slurry was poured quickly into a 20 ml slurry reservoir which was assembled to pack a 4.6 mm (inner diameter)×50 mm (length) mirror (walled) finished stainless steel column. A pump was triggered to start electronically from the Quick-Set pump control software at a configured set program shown in Table 10 below:

TABLE 10a

Loaded packing program for SG_MS_04A

| Pressure (Psi) | Flow rate (mL · min$^{-1}$) | Time |
|---|---|---|
| 9700 | 20 | 1 |
| 9700 | 19 | 2 |
| 9700 | 18 | 25 |

TABLE 10b

Loaded packing program for Exsil-pure 120 ™

| Pressure (Psi) | Flow rate (mL · min$^{-1}$) | Time |
|---|---|---|
| 9700 | 10 | 1 |
| 9700 | 9 | 2 |
| 9700 | 8 | 45 |

The flow rate was governed by the maximum pressure (9700 psi) attainable, which depends on the permeability of the packing material (silica) in a given column dimension (4.6×50 mm) relative to the packing solvent.

In this packing experiment, a stable packing flow rate at 16 mL.min$^{-1}$ was attained on the SG_MS_04A packing material at maximum pressure; whereas a flow rate of only 8 mL.min$^{-1}$ was generated by Exsil-pure 120™ as the maximum pressure. These observations indicate that the flow through channel in the SG_MS_04A column is more organised and connected compared to the Exsil-pure 120™ column. Even though Exsil-pure particles have a large pore size compared to SG_MS_04A silica particles as is shown from the BET result in Table 4. Exsil-pure particles demonstrate a lower permeability towards slurry packing compared to SG_MS_04A particles. This physical behaviour indicates that the SGMS silica material is a low pressure sub-2 micron silica based material.

Figure 5:
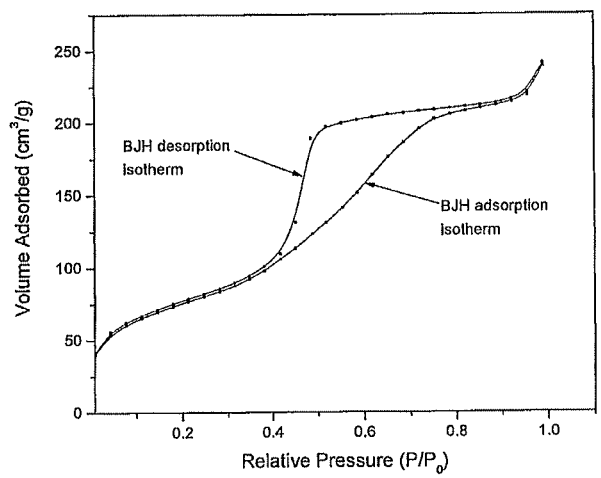
FIG. 5A is a graph showing the BJH adsorption and desorption isotherms of microparticles (SG_MS_04C) prepared by a process of the invention.
FIG. 5B is a graph showing the BJH adsorption pore size distribution (PSD) of microparticles (SG_MS_04C) prepared by a process of the invention.
Figure 5:
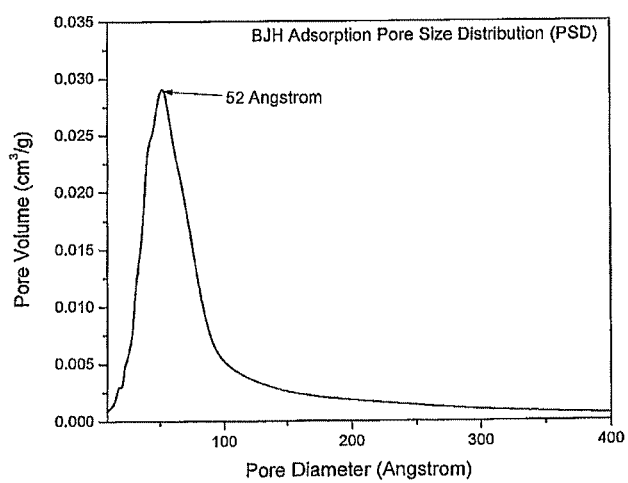
Figure 6:
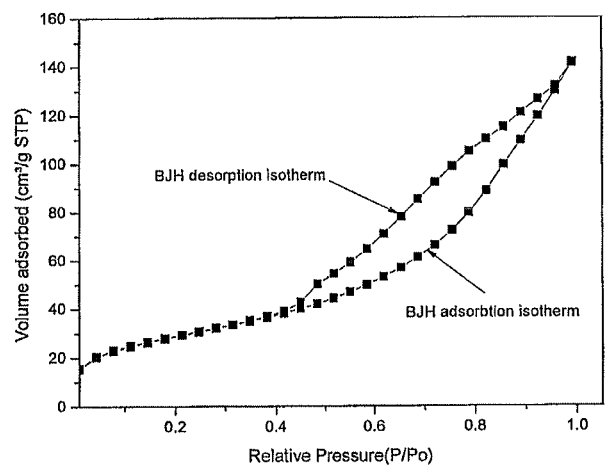
FIG. 6A is a graph showing the BIN adsorption and desorption isotherms of microparticles (SG_MS_04D) prepared by a process of the invention.
FIG. 6B is a graph showing the BJH adsorption pore size distribution (PSD) of microparticles (SG_MS_04D) prepared by a process of the invention.
Figure 6:
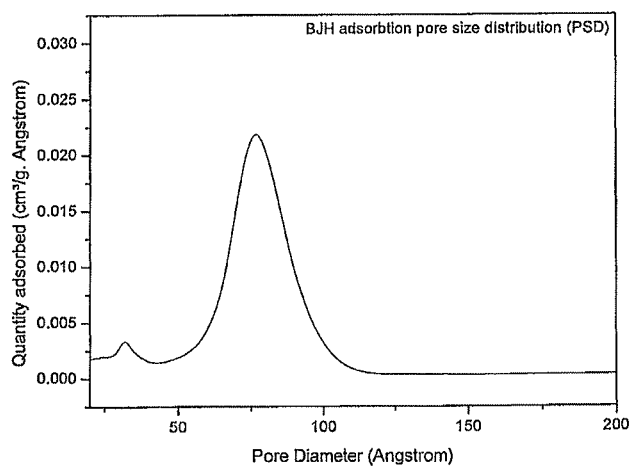

A possible reason for the sub-2 micron SGMS silica material having a low resistance to fluid dynamic (low back pressure) attribute could be due to the porous structure as revealed XRD data (FIG. 5). Compared to the Exsil-pure 120™ silica, the SG_MS_04A silica has an ordered pore structure of the P6 mm hexagonal phase where the mesophase pores of the shell are parallel to the silica non-porous surface. The calcined SGMS silica originated from the SBA-15 class of mesoporous material as can be seen from FIG. 6 whereas Exsil-pure 120™ material has no reflection peak at low angle, rather a continuous decreasing flat line (FIG. 7 line D) indicating a disordered pore structure which is likely to contribute to increased resistance to fluid dynamics (higher back pressure)

XRD analysis of the 1 h growth rate SGMS having 40 Å pore size was performed, as is shown in FIG. 19, the material has an ordered pore structure of the P6 mm hexagonal phase where the mesophase pores of the shell are parallel to the silica non-porous surface. This also confirms that the 1 h growth rate gave similar characteristics to the 24 h growth rate. However, after pore etching to increase the effective pore size from about 40 Å to about 90 Å to about 120 Å, the diffraction peak indicating ordered pore structure disappears.

Chromatography Application of Seeded Growth Mesoporous Shell (Core-shell) Particles

Example 7

Separation of Organic Test Mix

The particles produced by the process of Example 1 are monodisperse silica particles having a solid-core (non-porous) and a thick mesoporous shell layer formed perpendicular to the surface. Such particles may be called seeded growth mesoporous shells (SGMS) particles. This SGMS material has demonstrated excellent performance when used as packing material for liquid chromatography (LC) as compared to conventional totally porous silica (Exsil™ 1.5 µm). Particles prepared by the method of Example 1 have a sub-2 µm diameter (about 1.7 µm) and demonstrate good performance in conventional LC. In tests, the SGMS particles showed no problems associated with high back pressure compared to conventional totally porous silica (Exsil™ 1.5 µm).

Chromatographic data indicate that the SG_MS_04A silica particle (1.7 µm) (FIG. 8) has a better separation power compared to conventional totally porous silica particle (Exsil-120™, 1.5 µm) (FIG. 9) when packed in similar dimension of column. The number of theoretical plates per column calculated for fluorene in the organic test mix separation in the SGMS column is twice the value from Exsil-120™ totally porous particle and with better peak resolution (Table 11) under isocratic conditions.

TABLE 11

Figure 8:
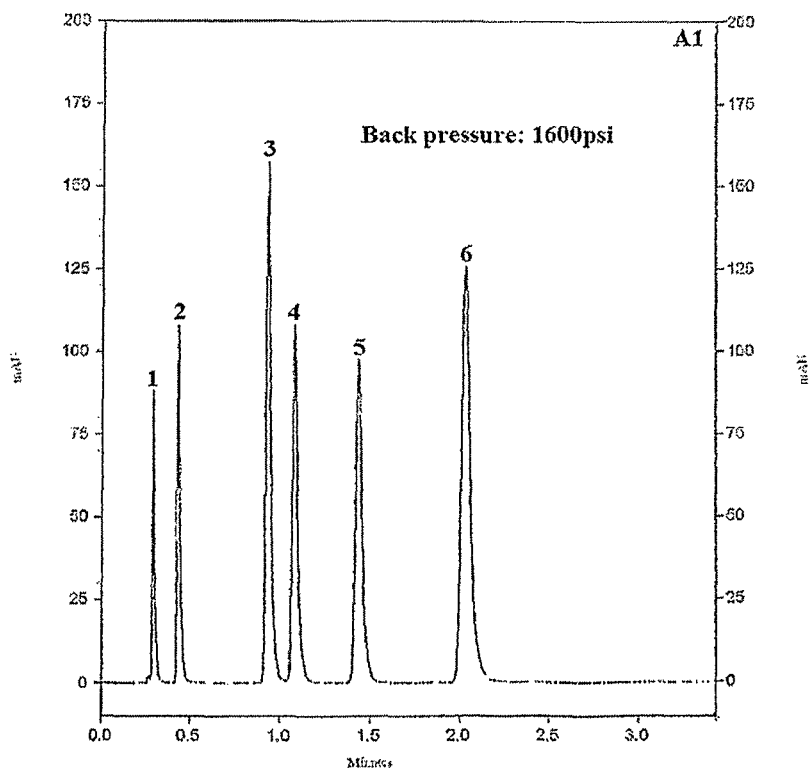
FIG. 8 is a graph showing chromatography separation data for 1.7 μm microparticles (SG_MS_04A) prepared by a process of the invention and used as a packing material under the conditions: mobile phase 60% acetonitrile: 40% water; temperature 23° C.; flow rate 1.5 ml/min; detector UV 254 nm, 20 Hz wherein 1=theophylline; 2=phenol; 3=4-chloro-1-nitrobenzene; 4=toluene; 5=ethyl benzene; 6=fluorene and wherein 2 μl of each of samples 1 to 6 were loaded onto the column by injection.
Figure 9:
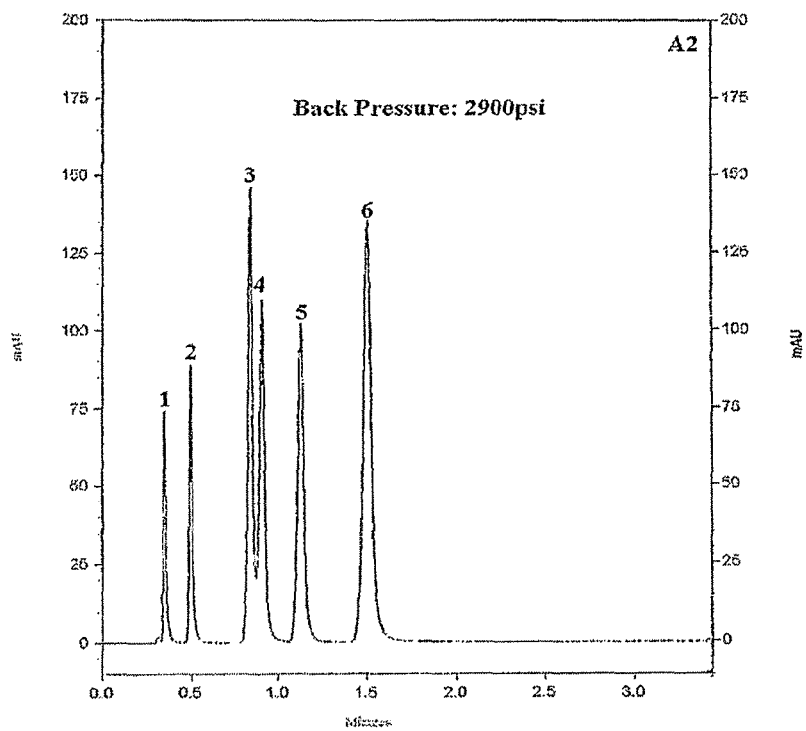
FIG. 9 is a graph showing chromatographic separation data for commercially available microparticles (Exsil-120™ pure totally porous 1.5 μm) used as a packing material under the conditions: mobile phase 60% acetonitrile: 40% water; temperature 23° C.; flow rate 1.5 ml/min; detector UV 254 nm, 20 Hz wherein 1=theophylline; 2=phenol; 3=4-chloro-1-nitrobenzene; 4=toluene; 5=ethylbenzene; 6=fluorene and wherein 2 μl of each of samples 1 to 6 were loaded onto the column by injection.

Chromatography performance of fluorene from FIG. 8 and FIG. 9

|  | RT | N/m | $T_f$ | α(6/5) |
|---|---|---|---|---|
| FIG. 8 | 2.03 | 185,000 | 1.12 | 1.52 |
| FIG. 9 | 1.5 | 95,000 | 1.02 | 1.47 |

Figure 12:
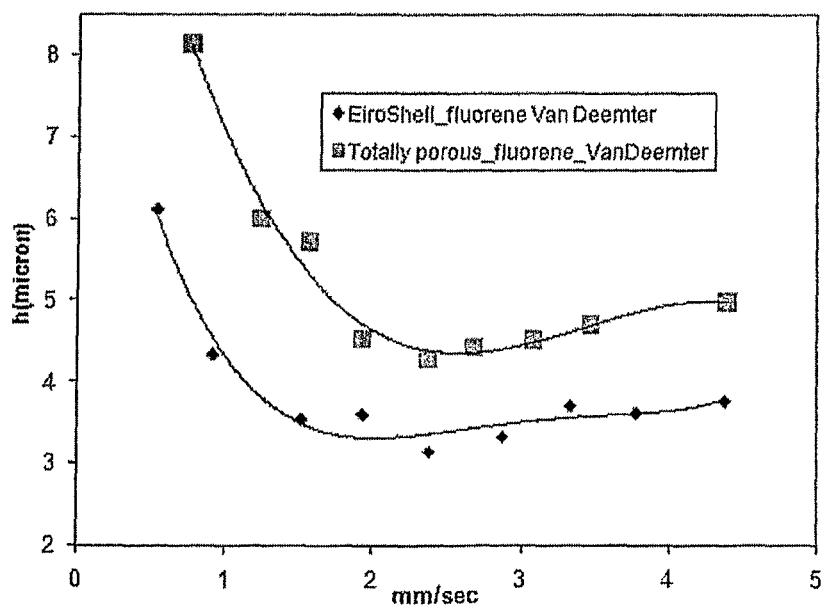
FIG. 12 is a graph showing a Van Deemter plot of microparticles prepared by a process of the invention (SG_MS_04—Eiroshell) and commercially available microparticles (Exsil™ totally porous silica)
Figure 13:
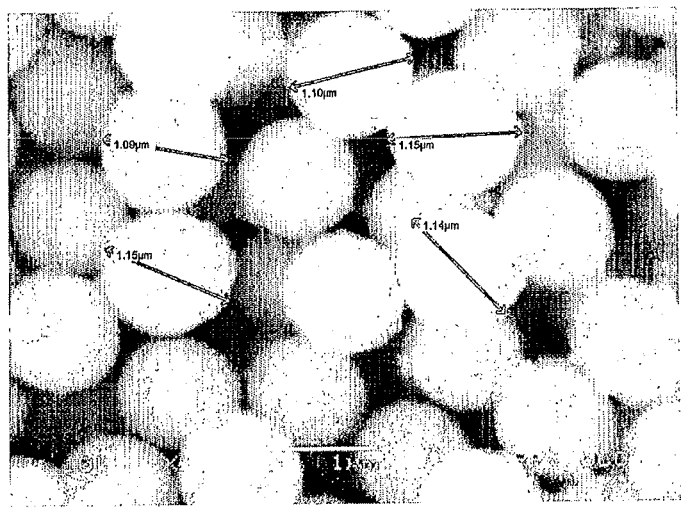
FIG. 13 is a scanning electron micrograph image of the microparticles synthesised according to Example 1 (SGMS-04C)
Figure 14:
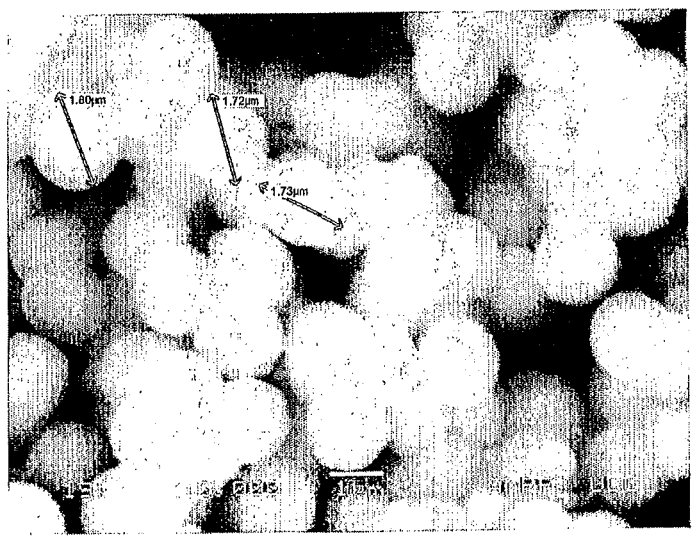
FIG. 14 is a scanning electron micrograph image of the microparticles synthesised according to Example 1 (SGMS-04D and initial part of SGMS-04E)

Evaluation based on the reduced van Deemter plot (FIG. 12) indicates that the SGMS silica particles have a greater reduced mass transfer coefficient due to the mesoporous shell present only at the surface and, hence, a faster diffusion rate at a the same given mobile phase linear velocity with the totally porous silica Exsil-120™. Although peak asymmetry is slightly better on the Exsil-120™, this is more likely due to differences in packing conditions.

Example 8

Separation of Sulphonamide Drug Compounds

Figure 10:
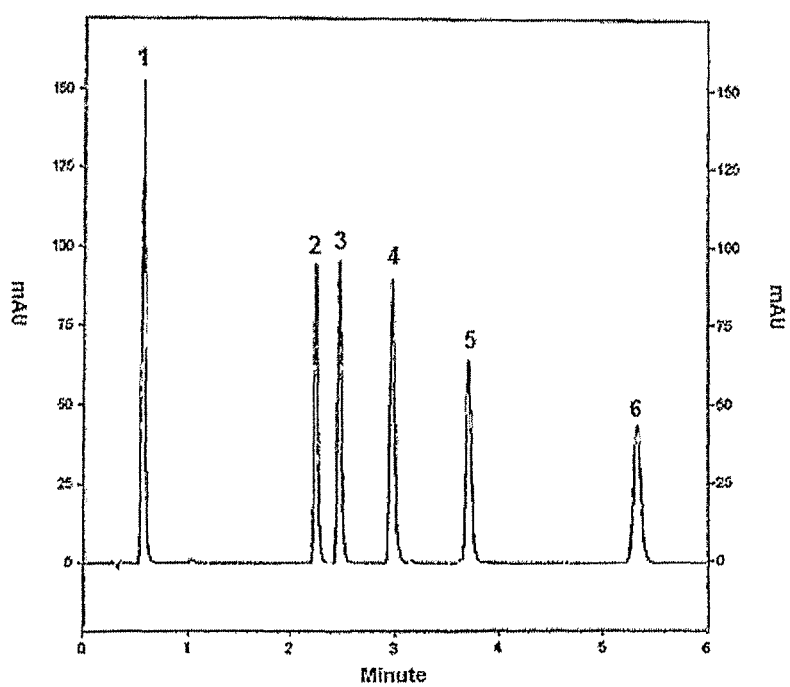
FIG. 10 is a graph showing chromatographic separation data for microparticles (SG_MS_04A 1.7 μm) prepared by a process of the invention and used as a packing material under the conditions: mobile phase 0.1% formic acid in deionised water; flow rate 1.0 ml/min; gradient 0.0 min 10% of a 0.1 formic acid in acetonitrile solution; 8.0 min 30% of a 0.1% formic acid in acetonitrile solution; detector UV 254 nm, 20 Hz; temperature 24° C. wherein 1=sulfanilamide; 2=sulfadiazine; 3=sulfathiazole; 4=sulfamerazine; 5=sulfamethazine; 6=sulfamethoxazole and wherein 2 μl of each of samples 1 to 6 were loaded onto the column by injection.
Figure 11:
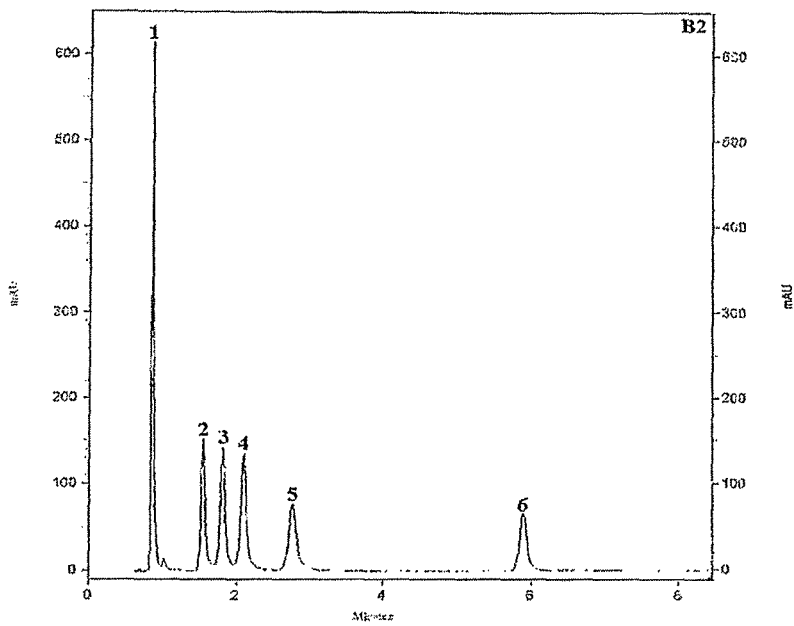
FIG. 11 is a graph showing chromatographic separation data for commercially available microparticles (Exsil-120™ pure totally porous 1.5 μm) used as a packing material under the conditions: mobile phase 0.1% formic acid in deionised water; flow rate 1.0 ml/min; Gradient 0.0 min 10% of a 0.1% formic acid in acetonitrile solution, 8.0 min 30% of a 0.1% formic acid in acetonitrile solution; detector UV 254 nm, 20 Hz; temperature 24° C. wherein 1=sulfanilamide; 2=sulfadiazine; 3=sulfathiazole; 5=sulfamethazine; 6=sulfamethoxazole and wherein 2 μl of each of samples 1 to 6 were loaded onto the column by injection.

Gradient separation of six sulphonamides drug compounds was tested (FIGS. 10 and 11). The gradient performance of SG_MS_04A particles (FIG. 10) was superior to the performance of totally porous silica (Exsil-120™) (FIG. 11), this is a clear indication that there is an improved mass transfer kinetics from the SGMS silica that is predominantly due to the physical structure of the particle (SGMS), i.e. a solid core and mesoporous shell layer. Under gradient conditions, a theoretical plate count per meter reaches over 1 million for SGMS silica particle compared to the totally porous silica (Table 12).

TABLE 12 chromatographic performance of Sulfamethoxazole in FIG. 10 and FIG. 11

|  | RT | N/m | $T_f$ | R(6/5) | R(4/3) |
|---|---|---|---|---|---|
| FIG. 10 | 7.15 | 1,244,000 | 1.08 | 19 | 5.3 |
| FIG. 11 | 5.9 | 340,000 | 1.02 | 17.8 | 2.1 |

Example 9

Other Chromatographic Test Performed on Bonded Phase Prepared on SGMS-04G (Large Pore SGMS Silica)

Two SGMS, 1.7 µm core-shell silica particles with different pore sizes and surface areas (390 and 205 m²/g and 40 Å and 90 Å) were functionalised with C8 ligand and further measured their performance against 1.5 µm totally porous C8 silica packing. Table 14 shows the material characterisation of the silica material studied, including the two SGMS and the totally porous silica packing.

TABLE 13

Material characterization data for unbound and bound SGMS and totally porous silica.

| | Unbound material | | | | | | | | bound material | | |
|---|---|---|---|---|---|---|---|---|---|---|---|
| | $d_p$ µm | % $C_0$ | —OH µmole·m⁻² | SA (m²/g) | PV (cc/g) | $PD_{des}$ (Å) | % $C_1$ | Δ% $C^a$ | % $C_2$ | %Δ $C^b$ | Coverage$_{total}$ µmole·m⁻² |
| SGMS-1 | 1.7 | 0.14 | 8.7 | 392 | 0.43 | 40 | 11.14 | 11.01 | 11.30 | 0.15 | 2.77 |
| SGMS-2 | 1.7 | 0.32 | 9.6 | 205 | 0.33 | 90 | 6.34 | 6.02 | 6.70 | 0.36 | 3.16 |
| TP-S | 1.5 | 0.21 | 6.3 | 275 | 0.75 | 120 | 6.78 | 6.57 | 6.64 | −0.14 | 2.13 |

$^a$Δ% C = % $C_1$ − % $C_0$ $^b$Δ% C = % $C_2$ − % $C_1$

Van Deemter Equation

The reduced van Deemter coefficient used for the overall kinetic plot is recorded in Table 14. The SGMS-1C8 column have the best performance for acenaphthene under the identical test conditions. SGMS-2C8 and TP-SC8 are almost identical except for the mass transfer kinetic measured by the C-term as described above; similarly, SGMS-1C8 and TP-SC8 possess almost similar C-term.

TABLE 14

Summary of van Deemter coefficients on SGMS silica particles and totally porous particles*.

|  | SGMS-1C8 | SGMS-2C8 | TP-SC8 |
|---|---|---|---|
| A | 0.931 | 0.948 | 1.176 |
| B | 5.026 | 5.923 | 7.408 |
| C | 0.012 | 0.531 | 0.016 |
| H(μm) | 4.12 | 6.13 | 5.13 |
| $h_{min}$ | 2.4 | 3.6 | 3.4 |
| K' | 13.22 | 5.29 | 5.55 |

*Kinetic plots were achieved by using the Kinetic Method Plot Analyzer template (Gert Desmet, Vrij University Brussel, Belgium)

In all separation performance carried out, a slightly longer retention time was observed in the SGMS silica packing. Narrower peak widths were produced on the SGMS packing compared to totally porous silica (Exsil-120™), this indicates that eddy diffusion and axial dispersion contribution to the plate height is lower in SGMS silica packing compared to commercially available Exsil-120™. This is evident from the van Deemter plot in FIG. 12.

Figure 25:
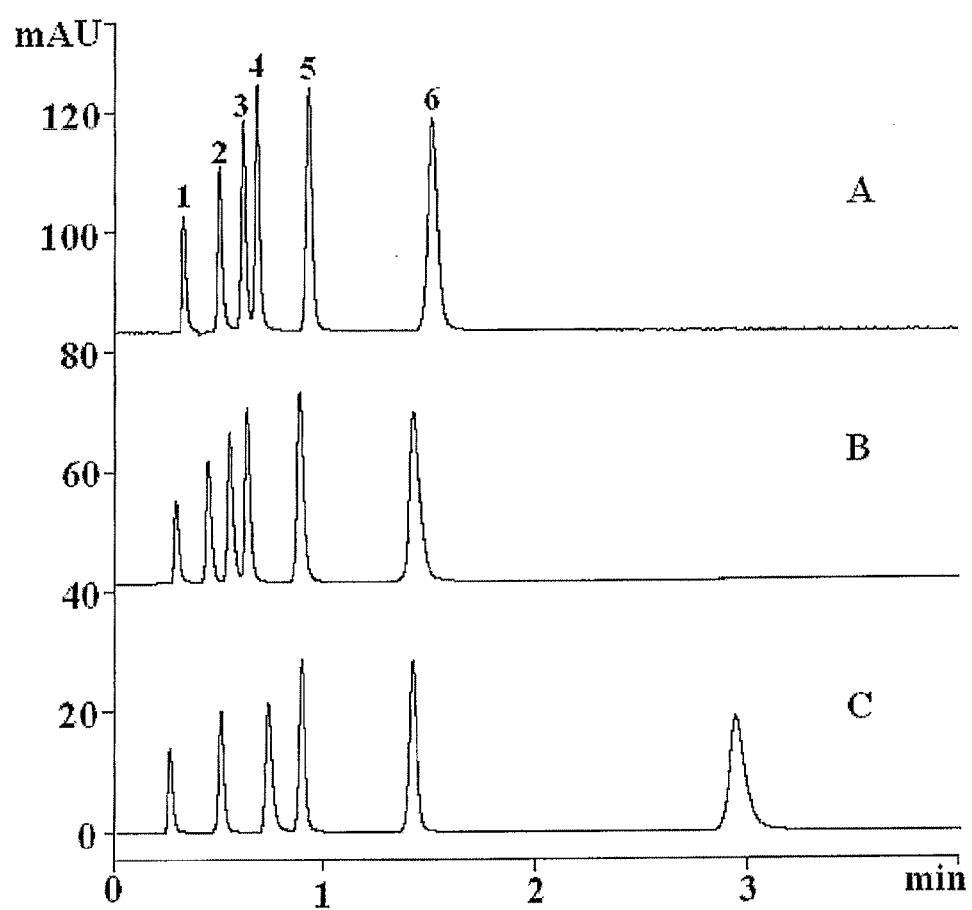
FIG. 25 is a Chromatogram showing the separation of; (1) uracil, (2) butylparaben (3) propanolol, (4) naphthalene, (5) acenaphthene, (6) amitriptyline on a 2.1 ID×50 mm stainless steel column packed with (A) TP-SC8, (B) SGMS-2C8 and (C) SGMS-1C8. Mobile phase: 75:25 methanol/20 mM $KH_2PO_4/K_2HPO_4$ buffer at pH 7. Flow rate: 0.35 mL/min. Temperature: 45° C. Detection: UV=254 nm.
Figure 26:
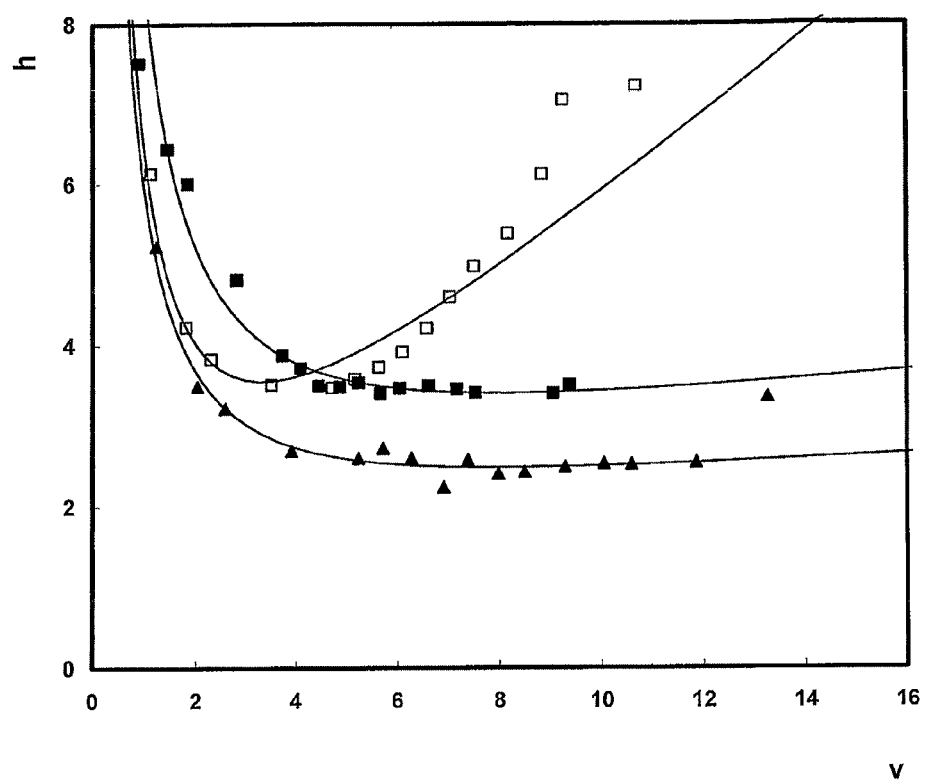
FIG. 26 shows the reduced parameters for van Deemter plots obtained on a 2.1 ID×50 mm packed column of SGMS-1C8 (▲), SGMS-2C8 (□) and TP-SC8 (■). Mobile phase was 65/35% Methanol/water. Temperature: 45° C.; Injection: 0.3 µl; Solute: acenaphthene.

The optimised separation application described above has also proven that core-shell silica particles synthesised in accordance with the methods described herein have thick porous shells which are highly suitable for Chromatographic separation as shown in FIG. 25, involving the separation of a highly basic compound (amitriptyline) at pH 7.

The advanced properties of the silica particles produced by the method described herein are highly promising and the particles may form a new generation of packing material that will redefine the use of sub-2 μm particles in liquid chromatography.

The invention is not limited to the embodiment hereinbefore described, with reference to the accompanying drawings, which may be varied in construction and detail.

Reference

[1] J. H. Kim, Yoon, S. B., Kim, J-Y., Chae, Y. B., Yu, J.-S., Colloid and surfaces A: Physicochem. Eng. Aspects 313-314 (2008) 77.
[2] S. B. Yoon, Kim, J-Y., Kim, J. H., Park, Y. J., Yoon, K. R., Park, S-K., Yu, J-S., J. Mater. Chem. 17 (2007) 1758.
[3] S. Lu, Pugh, R. J., Forssberg, E.; Interfacial Separation of Particles, Elsevier B V, Amsterdam, 2005.
[4] R. Atkin, V. S. J. Craig, E. J. Wanless, S. Biggs, Adv. Colloid and Interface Sci. 103 (2003) 219.
[5] R. Atkin, V. S. J. Craig, E. J. Wanless, S. Biggs, J. Phys. Chem. B 107 (2003) 2978.
[6] R. Atkin, V. S. J. Craig, E. J. Wanless, S. Biggs, Journal of Colloid and Interface Science 266 (2003) 236.
[7] R. Atkin, V. S. J. Craig, S. Biggs, Langmuir 16 (2000) 9374.
[8] D. Zhao, Feng, J.; Huo, Q.; Melosh, N.; Fredrickson, G. H.; Chmelka, B. F.; Stucky, G. D, Science 279 (1998) 548.
[9] P. Meakin (P. Meakin), P. Meakins), On Growth and Form, Martinus-Nijhoff, Boston, 1986.
[10] C. J. Brinker, Scherer, G. W.; Sol-gel Science: The Physics and Chemistry of Sol-gel processing, Boston Academic press, Boston, 1990.
[11] D. H. Napper, Journal of Colloid and Interface Science 58 (1977) 390.
[12] T. Sato, Ruch, R., Stabilization of Colloidal Dispersions by polymer Adsorption, Marcel Dekker, New York, 1980.
[13] M. Aubouy, Di Meglio, J.-M., Raphaël, E., Europhys. Lett. 24 (1993) 87.
[14] D. H. Napper, Polymeric Stabilization of Colloidal Dispersion, Academic press, New York, 1983.
[15] R. H. Ottewill, Journal of Colloid and Interface Science 58 (1977) 357.
[16] J. T. G. Overbeek, J. Colloid Inter. Sci. 58 (1977) 408.
[17] G. H. Bogush, Tracy, M. A.; Zukoski, C. F.;, J. Non-Crystaline solids 104 (1988) 95.
[18] C. du Fresne von Hohenesche, Ehwald, V., Unger, K. K., J. Chromatogr. A 1025 (2004) 177.

The invention claimed is:

1. A process for preparing silica core-shell microparticles comprising the steps of:
    a) growing a porous silica shell from a silica precursor onto the surface of non-porous silica particle dispersed in a mixed surfactant solution under basic pH conditions,
    b) hydrothermally treating the particles of (a) in an oil-in-water emulsion system; and
    c) calcining the particles of (b) to remove residual surfactants,
    wherein step (a) is repeated at least once to achieve a silica core-shell particle with an ordered mesoporous layered shell,
    wherein the mixed surfactant comprises a cationic surfactant of an alkyl trimethylammonium comprising the formula:

$C_nN(R)_3.X$ wherein: n is an integer between 12 and 20;
    R is an alkyl group of the form, $CH_3$, $CH_3CH_2$, $CH_3CH_2CH_2$, or $CH_3CH_2CH_2CH_2$; and
    X is Cl, Br or I,
    and a non-ionic surfactant of the formula:

    $PEO_xPPO_yPEO_x$, wherein: x is an integer between 5 and 106; and
    y is an integer between 30 and 85.

2. The process as claimed in claim 1 further comprising the step of:
    d) base etching the particles of CN to expand the size of the pores in the silica shell.

3. The process as claimed in claim 1 wherein the cationic surfactant is octadecyl trimethylammonium and/or hexadecyl trimethylammonium bromide.

4. The process as claimed in claim 1 wherein the non-ionic surfactant is $PEO_{20}$ $PPO_{70}PEO_{20}$ and/or $PEO_{106}$ $PPO_{70}$ $PEO_{106}$.

5. The process as claimed in claim 1 wherein the silica precursor is an alkoxy silica precursor.

6. The process as claimed in claim 1 wherein the silica precursor is one or more of tetrapropyl ortho silicate (TPOS), tetraethyl ortho silicate (TEOS), and tetramethyl ortho silicate (TMOS).

7. The process as claimed in claim 1 wherein the oil-in-water emulsion comprises one or more of an aliphatic alkane, a cycloalkane, or aromatic hydrocarbon of the formula:

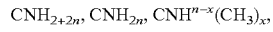
$CNH_{2+2n}$, $CNH_{2n}$, $CNH^{n-x}(CH_3)_x$, wherein: n is an integer between 6 to 12; and
x is an integer between 1 to 3.

8. The process as claimed in claim 1 wherein step (a) is performed at a temperature between about 25° C. to about 55° C. and wherein step (a) takes between about 1 hour and about 24 hours.

9. The process as claimed in claim 1 wherein the particles are hydrothermally treated at a temperature of from about 60° C. to about 130° C. and wherein the particles are hydrothermally treated from about 1 hour to about 72 hours.

10. The process as claimed in claim 1 wherein the particles are calcined at a temperature of about 500° C. to about 600° C. and_wherein the particles are calcined for between about 76 hours to about 24 hours.

11. The process as claimed in claim 1 wherein ammonia is added to the mixed surfactant solution to initiate each growth step.

12. The process as claimed in claim 1 wherein the oil unit of the oil-in-water emulsion system for the hydrothermal treatment of the particles comprises one or more of decane, trimethylbenzene and cylooctane.

13. The process as claimed in claim 1 wherein the oil-in-water emulsion comprises ammonium iodide.

14. The process as claimed in claim 1 wherein step (a) is repeated between 2 and 30 times.

15. The process as claimed in claim 1 wherein hydrothermally treated particles are dried prior to calcination.

16. The process as claimed in claim 15 wherein the particles are dried under vacuum.

17. The process as claimed in claim 15 wherein the particles are dried at a temperature of between about 98° C. to about 102° C.

18. The process as claimed in claim 1 wherein the particles are calcined at a ramping temperature.

19. The process as claimed in claim 18 wherein the temperature is ramped at a rate of between about 1° C. and about 10° C. per minute.

20. The process as claimed in claim 1 wherein the particles are base etched in an aqueous solution of ammonia and hydrogen peroxide.

21. The process as claimed in claim 20 wherein the particles are base etched at a temperature of about 75° C. for between about 8 hours to about 16 hours.

22. The process as claimed in claim 21 wherein the core has an average diameter of between about 0.6 μm and about 1.5 μm.

23. The process as claimed in claim 1 wherein silica core-shell particle has an average diameter of between about 0.9 μm and about 2.0 μm.

24. The process as claimed in claim 1 wherein the silica core-shell particle has an average diameter of about 1.7 μm comprising a core with an average diameter of about 1 μm.

25. The process as claimed in acclaim 1 wherein the pores are ordered in the SBA-15 class.

26. The process as claimed in claim 25 wherein the pores have an average size of between about 4 nm and about 30 nm.

27. The process as claimed in claim 25 wherein the pores have an average pore volume of between about 0.2 cc/g and about 2.0 cc/g.

28. The process as claimed in claim 25 wherein the pores have a specific surface area of from about 100 $m^2/g$ to about 1000 $m^2/g$.

29. The process as claimed in claim 1 comprising the step of attaching a functional ligand to the shell.

30. The process as claimed in claim 29 wherein the functional ligand is chemically attached to the shell.

* * * * *